US012775897B2

(12) United States Patent
Abramowitz

(10) Patent No.: US 12,775,897 B2
(45) Date of Patent: *Oct. 27, 2026

(54) SYSTEMS AND METHODS FOR GENERATING DYNAMIC REAL-TIME ANALYSIS OF CARBON CREDITS AND OFFSETS

(71) Applicant: Marc Lauren Abramowitz, Aspen, CO (US)

(72) Inventor: Marc Lauren Abramowitz, Aspen, CO (US)

(73) Assignee: Marc Lauren Abramowitz, Aspen, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/020,168

(22) Filed: Jan. 14, 2025

(65) Prior Publication Data

US 2025/0156788 A1 May 15, 2025

Related U.S. Application Data

(63) Continuation of application No. 18/461,275, filed on Sep. 5, 2023, now Pat. No. 12,229,702.

(60) Provisional application No. 63/403,558, filed on Sep. 2, 2022.

(51) Int. Cl.
*G06Q 10/0635* (2023.01)

(52) U.S. Cl.
CPC ................................ *G06Q 10/0635* (2013.01)

(58) Field of Classification Search
CPC .. G06Q 10/06; G06Q 10/063; G06Q 10/0635; G06Q 40/04
See application file for complete search history.

(56) References Cited

U.S. PATENT DOCUMENTS

| | | | | |
|---|---|---|---|---|
| 2008/0228665 | A1* | 9/2008 | Gotthelf | G06Q 40/06 705/37 |
| 2015/0073929 | A1* | 3/2015 | Psota | G06Q 30/0201 705/26.2 |
| 2015/0254766 | A1 | 9/2015 | Abramowitz | |
| 2022/0138649 | A1* | 5/2022 | Ashtekar | A01B 69/001 705/7.36 |
| 2022/0343433 | A1 | 10/2022 | Yan | |
| 2023/0360061 | A1* | 11/2023 | Madden | G06Q 30/018 |
| 2023/0401508 | A1 | 12/2023 | Lancaster | |

(Continued)

OTHER PUBLICATIONS

Zhang, Xing, Chongchong Zhang, and Zhuoqun Wei. "Carbon price forecasting based on multi-resolution singular value decomposition and extreme learning machine optimized by the moth-flame optimization algorithm considering energy and economic factors." Energies 12.22 (2019): 4283. (Year: 2019).*

*Primary Examiner* — William S Brockington, III
(74) *Attorney, Agent, or Firm* — Saul Ewing LLP

(57) ABSTRACT

A carbon credit marketplace (CCM) implements a platform for the exchange, and rating, of carbon credits and associated offsets. The platform receives entity carbon credit data as well as structured and unstructured data from disparate sources including general economic data sources, government data sources, and proprietary data sources. The received data is used by a carbon credit rating model to assign a carbon credit rating for a particular carbon credit, offset, or capture. Compliance with governmental regulations is achieved through the exchange, or sale of carbon credits and/or offsets.

20 Claims, 24 Drawing Sheets

(56) References Cited

U.S. PATENT DOCUMENTS

| | | | |
|---|---|---|---|
| 2024/0078492 | A1 | 3/2024 | Abramowitz |
| 2024/0161126 | A1 | 5/2024 | Abbott |
| 2024/0330764 | A1 | 10/2024 | Pattanaik |
| 2024/0403420 | A1 | 12/2024 | Lal |
| 2024/0414190 | A1 | 12/2024 | Lal |
| 2025/0077910 | A1 | 3/2025 | Ezrielev |

* cited by examiner (DETERMINE DYNAMIC CREDIT RATING)

(BOND INFORMATION)

(DETERMINE BOND ATTRIBUTES VALUES)

| CORPORATE BOND ATTRIBUTES | CASH FLOWS | PROFITABILITY | CORPORATE STRUCTURE | LEADERSHIP & OPERATIONAL |
|---|---|---|---|---|
| WEIGHTS | 25 | 25 | 25 | 25 |

FIG. 4A
(EXAMPLE CORPORATE BOND ATTRIBUTES WEIGHTS)

| CORPORATE BOND ATTRIBUTES | CASH FLOWS | PROFITABILITY | CORPORATE STRUCTURE | LEADERSHIP & OPERATIONAL |
|---|---|---|---|---|
| WEIGHTS | 25 | 25 | 50 | 0 |

FIG. 4B
(EXAMPLE CORPORATE BOND ATTRIBUTES WEIGHTS)

| MUNICIPAL BOND ATTRIBUTES | ECONOMIC | POLITICAL | TAXATION | BUDGETARY L |
|---|---|---|---|---|
| WEIGHTS | 25 | 25 | 35 | 15 |

FIG. 4C
(EXAMPLE MUNICIPAL BOND ATTRIBUTES WEIGHTS)

| BONDS V QUANTIZED CORPORATE BOND ATTRIBUTES | CASH FLOW | PROFITABILITY | CORPORATE STRUCTURE | LEADERSHIP OPERATIONAL | SCORE | BOND RATING |
|---|---|---|---|---|---|---|
| BOND 1 | VALUE 1 USING WEIGHT=25 | VALUE 2 USING WEIGHT=25 | VALUE 3 USING WEIGHT=25 | VALUE 4 USING WEIGHT=25 | 37 | 7 |
| BOND 2 | VALUE 5 USING WEIGHT=25 | VALUE 6 USING WEIGHT=25 | VALUE 7 USING WEIGHT=35 | VALUE 8 USING WEIGHT=15 | 39 | 7 |
| | | | | | | |
| BOND N | VALUE 9 USING WEIGHT=25 | VALUE 10 USING WEIGHT=25 | VALUE 11 USING WEIGHT=50 | VALUE 12 USING WEIGHT=0 | 90 | 1 |

FIG. 5

| | | |
|---|---|---|
| BOND A | PRICE A | ... other attributes |
| BOND B | PRICE B | ... other attributes |
| BOND C | PRICE C | ... other attributes |

FIG. 9A

| | | | (CREDIT RATING) |
|---|---|---|---|
| BOND A | PRICE A | ... other attributes | 1 |
| BOND B | PRICE B | ... other attributes | 1 |
| BOND C | PRICE C | ... other attributes | 3 |

FIG. 9B

| BONDS | PRICE | OTHER ATTRIBUTES | CREDIT RATING | OTHER ANALYTICS | CHANGE/TREND IN 1 YR |
|---|---|---|---|---|---|
| BOND A | PRICE A | ... other attributes | 1 | | 1% |
| BOND B | PRICE B | ... other attributes | 1 | | NO CHANGE |
| BOND C | PRICE C | ... other attributes | 3 | | 50% |

FIG. 9C

| | S&P | MOODY'S | FITCH | ACTUAL CREDIT RATING | MAPPED TO S&P | MAPPED TO MOODY'S | MAPPED TO FITCH'S |
|---|---|---|---|---|---|---|---|
| BOND A | AAA | | | 1 | AAA | | |
| BOND B | | | | 1 | AAA | | |
| BOND C | AAA | | | 3 | BBB | | |

FIG. 9D

SYSTEMS AND METHODS FOR GENERATING DYNAMIC REAL-TIME ANALYSIS OF CARBON CREDITS AND OFFSETS

CROSS-REFERENCE TO RELATED APPLICATIONS

This application is a continuation of U.S. patent application Ser. No. 18/461,275, filed Sep. 5, 2023, which claims priority to U.S. Provisional Application No. 63/403,558, filed Sep. 2, 2022, which are hereby incorporated by reference as if submitted in their entirety.

FIELD OF THE INVENTION

The present disclosure relates to systems and methods for real-time analysis of carbon credits and, more particularly, to systems and methods for reducing the emission of greenhouse gases using real-time pricing and risk-analysis of carbon credits and offsets.

BACKGROUND

Currently, there are a handful of credit rating agencies that are looked to for providing trusted credit ratings of debt securities including but not limited to corporate bonds, government bonds, and the like. Standard & Poor's, Moody's Investor Services, and Fitch Ratings, Inc. are the three most prominent, trusted, and relied upon credit rating agencies in the industry. For example, the credit ratings they produce are used to determine the interest rate a bond issuer is required to pay investors for a particular bond or to determine the funding and capital levels required of the issuer to maintain to cover potential defaults of the bond. These and other credit rating agencies provide credit rating tools and related analytics.

However, despite the seemingly robust credit ratings produced by these large and powerful agencies, the credit rating agencies were found to have played their part in the financial crises of 2007-2008 in part by failing to determine risk correctly.

Across industries and around the world, organizations are committing to combatting climate change by striving to balance or eliminate their carbon emissions by 2050. However, obtaining a net zero balance or elimination of carbon emissions presents a serious challenge for many organizations. One solution for challenged organizations is to "offset" their carbon emissions production with an equal or greater carbon emissions reduction. A carbon credit is essentially a tradable certificate that permits the emission of greenhouse gases. Typically, one carbon credit gives the certificate holder the right to emit one metric ton of carbon dioxide ($CO_2$). Environmental and economic climate policies typically limit greenhouse emissions and put a price on them. In accordance with these policies, governments may issue and assign carbon credits to local businesses, organizations, manufacturers, etc. Currently, there is no generally accepted accounting convention or methodology with which to price and evaluate the quality of carbon credits. Current approaches generally use fragmented, incomplete, and unstandardized information to determine, without specificity and/or repeatability, the price, quality, and risks associated with carbon markets and their participants. For example, the United Nation's current Carbon Offset Platforms relies on a static questionnaire at the outset from which to initially calculate individual carbon footprints. Without robust due diligence and advocacy ensuring the quality of carbon credits, carbon markets will not reach their full potential in addressing climate change.

Therefore, real-time technology-based mechanisms to evaluate carbon-credit worthiness, quality, and price from structure and unstructured data on an ongoing basis from disparate sources is highly desirable.

SUMMARY

The embodiments disclosed herein relate to systems and methods for providing real-time quality/risk analysis and dynamic pricing of carbon credits and offsets. A system and method is provided that receives carbon credit value, historical carbon credit certificate issuance data, carbon offset purchase data, government compliance data, carbon offset data, and structured and unstructured carbon credit related data from disparate sources including but not limited to general economic data sources, government data sources, and proprietary data sources. Users can specify attributes of the received carbon credit related data and can specify weights for the attributes. A carbon credit pricing algorithm computes a score for each carbon credit using the weighted attributes for the carbon credit and then determines a pricing from the score. Techniques are provided for improving accuracy of the credit pricing, for example using neural networks to make adjustments in the attributes or the weights.

In one aspect, a carbon credit marketplace (CCM) computing device is disclosed. The CCM computing device comprises at least one processor in communication with a memory device. The at least one processor is configured to receive carbon credit information associated with a carbon credit certificate and perform an analysis of the carbon credit certificate based on the received carbon credit information. The at least one processor is further configured to determine and assign values to a plurality of attributes of the carbon credit certificate based on the analysis of the carbon credit information, wherein each carbon credit attribute is given a weighting relative to the other plurality of attributes. The at least one processor is further configured to determine, by a scoring algorithm, a score for the carbon credit certificate, based on the carbon credit weighted attribute values and determine a carbon credit rating based on the score and a mapping of score ranges to carbon credit ratings.

In another aspect, a computer-implemented method for dynamically generating carbon credit ratings is disclosed. The computer-implemented method comprises receiving carbon credit information associated with a carbon credit certificate and performing analysis of the carbon credit certificate based on the received carbon credit information. The computer-implemented method further comprises determining and assigning values to a plurality of attributes of the carbon credit certificate based on the analysis of the carbon credit information, wherein each carbon credit attribute is given a weighting relative to the other plurality of attributes. The computer-implemented method further comprises determining, by a scoring algorithm, a score for the carbon credit certificate, based on the carbon credit weighted attribute values and determining a carbon credit rating based on the score and a mapping of score ranges to carbon credit ratings.

In yet another aspect, at least one non-transitory computer-readable media having computer-executable instructions embodied thereon is disclosed. The computer-executable instructions, when executed by a carbon credit marketplace (CCM) computing device including at least one processor in communication with a memory device, cause the at least one processor to receive, from the memory device, carbon credit information associated with a carbon credit certificate and perform analysis of the carbon credit certificate based on the received carbon credit information. The computer-executable instructions further cause the processor to determine and assign values to a plurality of attributes of the carbon credit certificate based on the analysis of the carbon credit information, wherein each carbon credit attribute is given a weighting relative to the other plurality of attributes. The computer-executable instructions further cause the processor to determine, by a scoring algorithm, a score for the carbon credit certificate, based on the carbon credit weighted attribute values and determine a carbon credit rating based on the score and a mapping of score ranges to carbon credit ratings.

BRIEF DESCRIPTION OF THE DRAWINGS

The figures described below depict various aspects of the systems and methods disclosed therein. Each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein:

FIGS. 4A-4C are tables of example bond attributes and respective weights, according to an embodiment.

FIG. 5 is a table of bonds versus specified, quantized corporate bond attributes including bond rating, according to an embodiment.

FIGS. 9A-9D are tables of bond portfolios with corresponding bond attributes that are used as input into a dynamic bond rating service and the respective output tables, according to an embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

Generating a Dynamic Credit Risk Rating for a Debt Security

Figure 1:
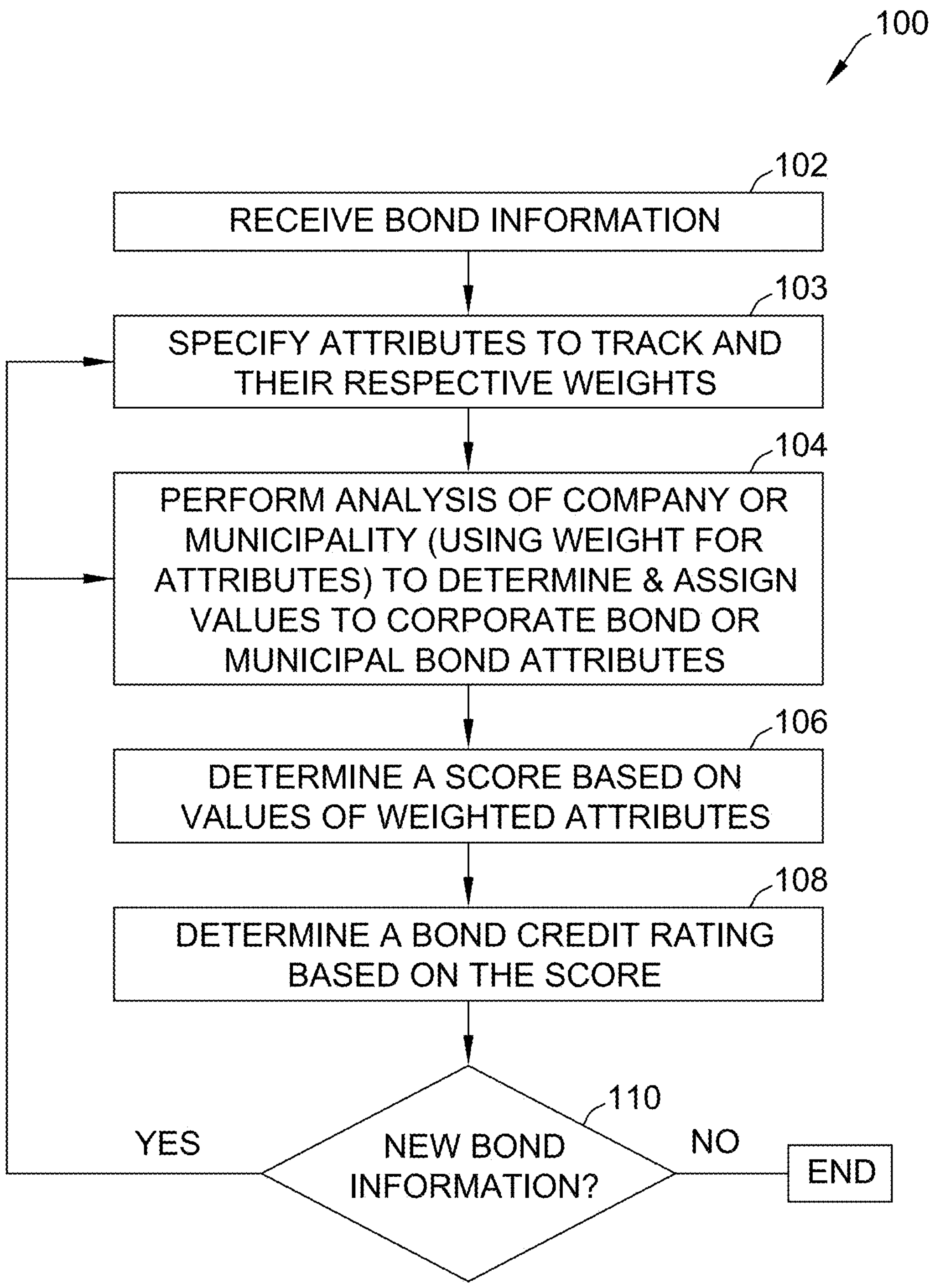
FIG. 1 is a flow diagram of dynamically generating a bond credit rating, according to an embodiment.

An embodiment of the invention can be understood with reference to FIG. 1, a flow diagram of dynamically generating a bond credit rating 100. At step 102, a debt security credit risk algorithm receives debt security related data, e.g., bond related information as illustrated in FIG. 1, from disparate sources both internal to an organization running the debt security credit risk algorithm and external such as but not limited to financial and governmental institutions that supply debt security data and related statistics as a service to the financial industry. It should be appreciated that the term, bond, may be used herein for purposes of illustration only and is not meant to be limiting.

At step 103, the debt security credit risk algorithm receives information regarding which bond attributes are to be used in the computation of credit risk. For example, price or the cash flows of the organization may be specified as attributes to use in the computation. In an embodiment, a user interface is provided that allows a user to enter the attributes. For example, a user may be provided with a list of attributes that are available in a particular data set within the system running the debt security credit risk algorithm. For example, the user may select the cash flows attribute or may decide not to select the cash flows. As well, in an embodiment, the specified attributes can be provided to the debt security credit risk algorithm as an input file. For example, the system hosting the debt security credit risk algorithm may include an automated process which feeds the list of specified attributed to the debt security credit risk algorithm as input.

In a similar fashion, the debt security credit risk algorithm received weights for each bond attribute. For example, the list of attributes fed to the debt security credit risk algorithm may include cash flows and may also include a weight of 25% for the cash flow attribute. The weight specifies the level of important of the weighted attribute. For example, a weight of 25 out of 100 possible means that the attribute given that weight has an importance of 25% compared to the remaining attributes. As another example, cash flows are assigned a weight of 25, a profitability attribute is assigned a weight of 25, and a corporate structure attribute is assigned a weight of 50 (see FIG. 4B.) Thus, in this example, the corporate structure attribute is 100 percent more important than either the cash flows or profitability attributes. Also, in a similar fashion, the weights are user-configurable as are specifying the attributes. That is, a user can enter the amount of weight for each specified attribute or can select from a list of available weight values. In an embodiment, the weights can be provided to the debt security credit risk algorithm as an input file, either on a one-off basis or as part of an automated procedure.

It should be appreciated that in an embodiment, the attributes and weights are configurable so that the debt security credit risk algorithm captures the factors which the user believes can drive a bond to get upgraded or downgraded, etc.

In an embodiment, one or more of the weights are adjusted by the debt security credit risk algorithm. The debt security credit risk algorithm incorporates a neural network or other machine learning model that, based on in part but not limited to a comparison of input bond data that includes bond credit ratings with past or predicted bond data that includes bond credit ratings, adjust the weight parameters as necessary to improve the accuracy of the credit rating computation.

In an embodiment, the level of granularity of the ultimately computed credit rating is important, because it is an object of the invention for the credit rating to be sensitive to and to reflect significant changes in the credit risk of the underlying issuer or bond itself. That is, it is important for even slight changes as well as large changes to any of the bond attributes to be detected and reflected in the credit rating. These slight changes as well as large changes are captured in the level of granularity as specified in, but not limited to, the attributes and the respective weights. For example, it is contemplated that a user can enter as many types of attributes as is needed for capturing an important change in the credit rating of the given bond. It further is contemplated that a user can specify the level of accuracy, e.g. to the decimal place, of any particular attribute value.

In an embodiment, the debt security credit risk algorithm, can compute a level of change in a particular attribute. For example, the debt security credit risk algorithm can compute a one-percent change in the price of the given bond. Further, in an embodiment, threshold values can be input into the debt security credit risk algorithm such that the debt security credit risk algorithm can determine whether a particular change in value of an attribute has reached or surpassed the threshold. Further, when the threshold is reached or surpassed, the debt security credit risk algorithm can perform further operations, such as sending a notification to a user. For example, a user can be notified via email when the price of a particular bond has changed by over a certain percentage.

In a similar fashion, in an embodiment, the debt security credit risk algorithm can compute when the credit rating value has changed beyond a specified input threshold value or beyond a tolerance level of change from the previously computed credit rating. As well, the debt security credit risk algorithm can alert or otherwise notify a user or another component in the system when such threshold has been passed.

At step 104, the debt security credit risk algorithm performs analysis of company or municipality data using in part the attributes weights and generates and assigns values to the corporate bond or municipal bond attributes.

At step 106, the debt security credit risk algorithm generates a score based on the values of the weighted attributes. For example, the debt security credit risk algorithm can compute that Bond 1 has score 37 and Bond 2 has score 39 (see FIG. 5.)

At step 108, the debt security credit risk algorithm generates the bond credit rating based on the computed score. For example, for Bond 1 having score 37, the debt security credit risk algorithm determines that the credit rating is 7. Similarly, for Bond 2 having score 39, the debt security credit risk algorithm determines that the credit rating is 7. (See FIG. 5.)

At question box 110, the debt security credit risk algorithm checks whether there is any new input bond information to process. If not, the debt security credit risk algorithm ends. If yes, in an embodiment, control returns to step 103, in which the attributes or the weights can be specified. In another embodiment, the attributes and the weights do not need to be specified again, thus control goes to step 104, at which the analysis is performed.

It should be appreciated that aspects of these steps are user configurable, administratively configurable, or even configurable by design such as by business design. For example, an embodiment can be provided that allows the attributes and weights to be specified for those users whose user profiles permit them to do so, while other users may not have permission to specify the attributes and the weights.

Figure 2:
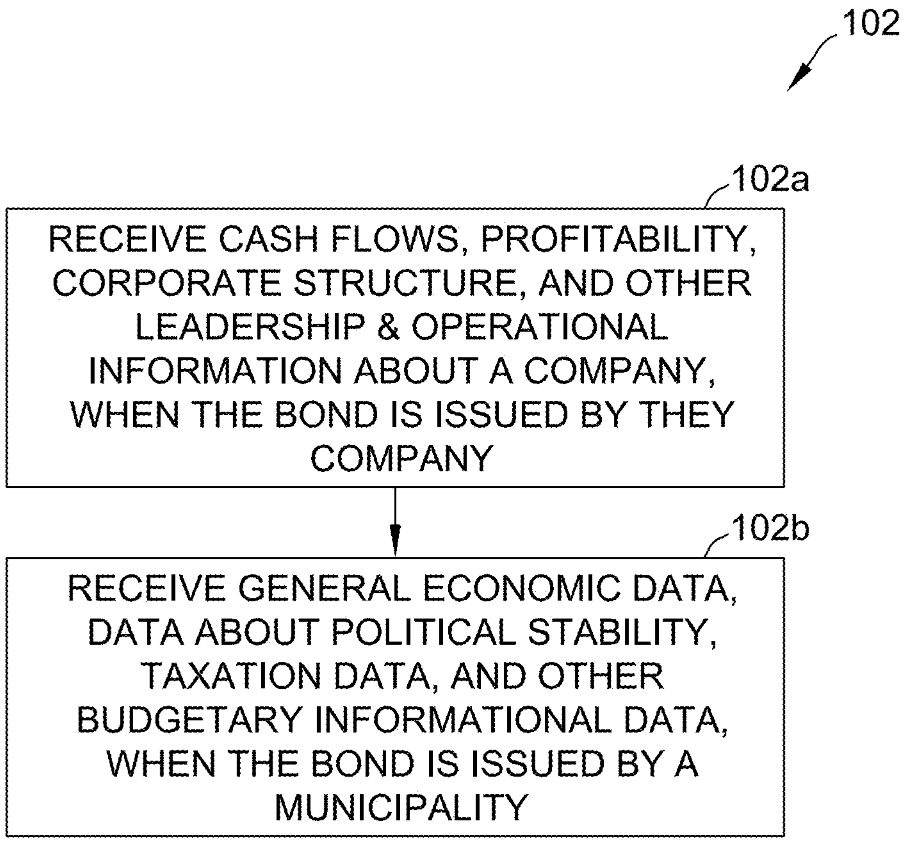
FIG. 2 is a flow diagram of receiving bond information, according to an embodiment.

An embodiment can be understood with reference to FIG. 2, a flow diagram of receiving bond information. At step 102*a*, the debt security credit risk algorithm receive cash flows, profitability, corporate structure, and other leadership and operational information about a company, when the bond is issued by the company. Similarly, at step 102*b*, the debt security credit risk algorithm receives general economic data, data about political stability, taxation data, and other budgetary informational data, when the bond is issued by a municipality. It should be appreciated that the particular type of bond information collected and, similarly, the type of attributes defined on top of the collected data, are by way of example only and are not meant to be limiting. For example, an embodiment can collect any other type of data regarding bonds that are considered important to a user in generating a dynamic credit rating. It further should be appreciated that while steps 102*a* and 102*b* describe corporate bond data and municipal bond data, respectively, these details are by way of example only and are not meant to be limiting. For example, data regarding Mortgage Backed Securities (MBS) can also be collected.

Figure 3:
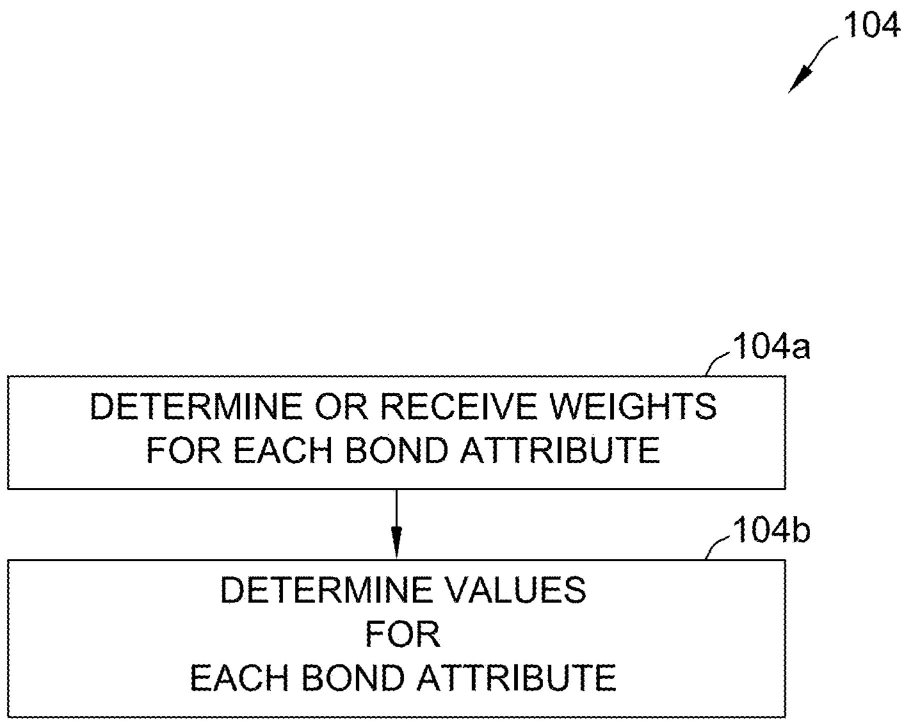
FIG. 3 is a flow diagram of determining or receiving weights for each bond attribute and determining values for each bond attribute, according to an embodiment.

An embodiment can be understood with reference to FIG. 3, a flow diagram of determining or receiving weights for each bond attribute and determining values for each bond attribute. At step 104*a*, the debt security credit risk algorithm determines or receives weights as input for each bond attribute, e.g. as described above. At step **104*b***, the debt security credit risk algorithm determine values for each bond attribute, e.g. as described above.

An embodiment can be understood with reference to FIGS. 4A-4C showing example bond attributes and respective weights. Specifically, FIG. 4A shows example corporate bond attribute weights, FIG. 4B shows another example of corporate bond attribute weights, and FIG. 4C shows example municipal bond attribute weights. It should be appreciated that the details are by way of example only and are not meant to be limiting. For example, an implementation can include 'bond price' as an attribute.

An embodiment can be understood with reference to FIG. 5, a table of bonds versus specified, quantized corporate bond attributes including bond rating. In an embodiment, quantized values for corporate bond attributes are generated. In another embodiment, the bond attribute values or weights can be entered. For example, a bond analyst can decide to enter a particular value for an attribute or weight. The weighted attributes are used by the debt security credit risk algorithm to generate a score and the score is used to determine a bond rating. In an embodiment, because the level of granularity of the attributes, their values, the weights, their values, and any intermediary values are important, slight changes in bond values can produce slightly different scores. However, a user or the debt security credit risk algorithm may determine that certain differences are negligible or otherwise unimportant and should not be counted. Thus, an embodiment provides a mapping of ranges of scores to credit ratings. For example, in FIG. 5, although Bond 1 and Bond 2 have different scores, namely, 37 and 39, respectively, Bond 1 and Bond 2 have the same credit rating, namely, 7. Thus, in this example, both 37 and 39 get mapped to credit rating 7. In an embodiment, the score values, ranges, credit rating values, and mapping of score ranges to credit ratings are configurable.

For example, a user applying the debt security credit risk algorithm can configure the above-described variables as part of an input process in running the debt security credit risk algorithm and using the debt security credit risk algorithm as a tool. As another example, a financial institution can configure any of the above-described variables in accordance with business financial objectives.

Generating Dynamic Data Sets for Real-Time Bond Rating and Related Analytics

A real-time bond rating system and method deploys dynamic data sets which is responsive to and adjusts related analytics to quantify economic exposure, in a real time fashion to underwriters, etc.

Figure 6:
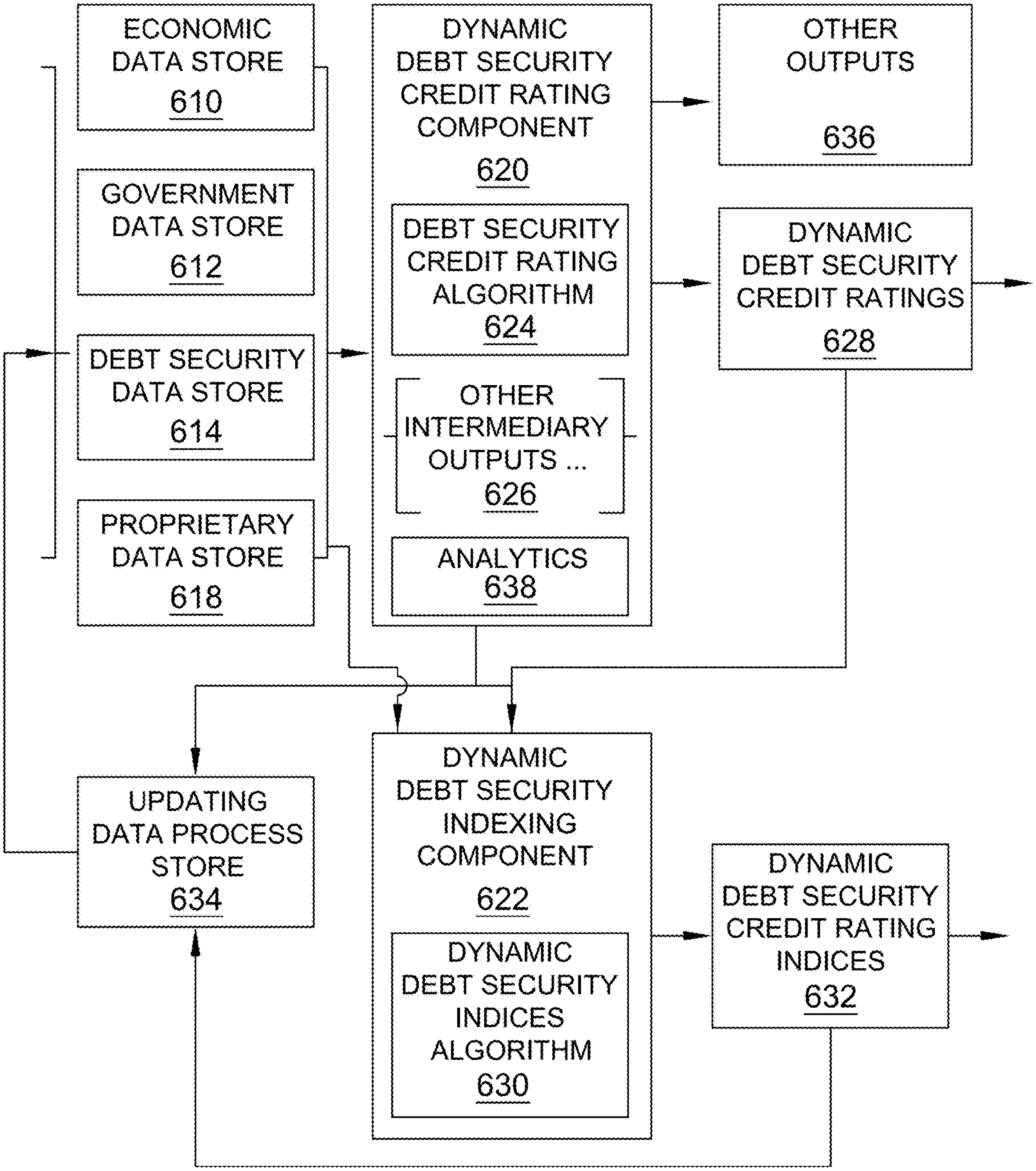
FIG. 6 is a flow diagram illustrating the flow of input debt security-related data into a dynamic debt security credit rating component and a dynamic debt security indices component for producing dynamic credit ratings and dynamic debt security credit rating indices, according to an embodiment.

An embodiment can be understood with reference to FIG. 6, a flow diagram illustrating the flow of input debt security-related data into a dynamic debt security credit rating component and a dynamic debt security indices component for producing dynamic credit ratings and dynamic debt security indices with credit ratings.

In an embodiment, debt security related data, including but not limited to economic data 610, government data 612, debt security data 614, and proprietary data 618 are input into a dynamic debt security credit rating component 620. It should be appreciated that these data are by way of example only and are not meant to be limiting. In an embodiment, proprietary data 618 can include but are not limited to non-published or otherwise private data regarding a particular debt security or the underlying issuer. In an embodiment, proprietary data 618 can include fictitious or information constructed on-the-fly by a user to run the system to obtain results for further analysis.

Dynamic debt security credit rating component 620 contains a debt security credit rating algorithm 624. An exemplary algorithm is the debt security credit risk algorithm described above and illustrated in FIG. 1. However, it should be appreciated that the debt security credit risk algorithm can be any debt security credit rating algorithm that can be accessed via standard programming interfaces such as but not limited to application programming interfaces (API). In accordance with the embodiment, intermediary results from running the credit rating algorithm can be captured as intermediary outputs 626. In an embodiment, intermediary results 626 are configurable. That is, a user can configure component 620 to capture and store particular intermediary outputs. These outputs 626 can be outputted as other outputs 636 for further processing by other systems or users.

In an embodiment, the output of debt security credit rating algorithm 624 are dynamic debt security credit ratings 628. In an embodiment, dynamic debt security credit ratings 628 are sent out to other processes, such as for example reporting processes or other analysis processes.

As well, in an embodiment, dynamic debt security credit ratings 628 are inputted into a dynamic debt security indices component 622. As well, economic data store 610, government data store 612, debt security data store 614, and proprietary data store 618 can send data to dynamic debt security indices component 622.

Dynamic debt security indices component 622 contains a dynamic debt security indexing algorithm 630 that uses the credit ratings and any relevant data from data stores 610-618 to generate one or more dynamic debt security credit rating indices 632. In an embodiment, dynamic debt security credit rating indices 632 are sent out to other processes, such as for example reporting processes or other analysis processes.

In an embodiment, dynamic debt security credit ratings 628 and dynamic debt security credit rating indices 632 are inputted into an updating data process 634. Updating data process 634 takes this data as well as any other current data (not shown) and updates economic data store 610, government data store 612, debt security data store 614, and proprietary data store 618, as appropriate.

In an embodiment, dynamic debt security credit rating component 620 contains an analytics component 638 that obtains real-time or historical data from data stores 610-618 to generate meaningful statistics regarding the securities and the respective credit ratings. For example, analytics component 638 can create graphs of trends regarding the history of the credit ratings of a particular set of bonds or of the credit ratings of bonds in a particular index.

Providing High Quality, Accurate Analytic Capabilities for a Dynamically Generated Debt Security Credit Risk Rating An embodiment uses a dynamically generated debt security credit risk rating in a multitude of analytic scenarios including but not limited to: comparing the rating to past ratings or predicted future ratings; comparing the rating with those of others that are similar such as in the same industry sector; comparing the rating with market assessments via metrics such as credit spreads; comparing the rating with ratings from other credit rating agencies.

Figure 7:
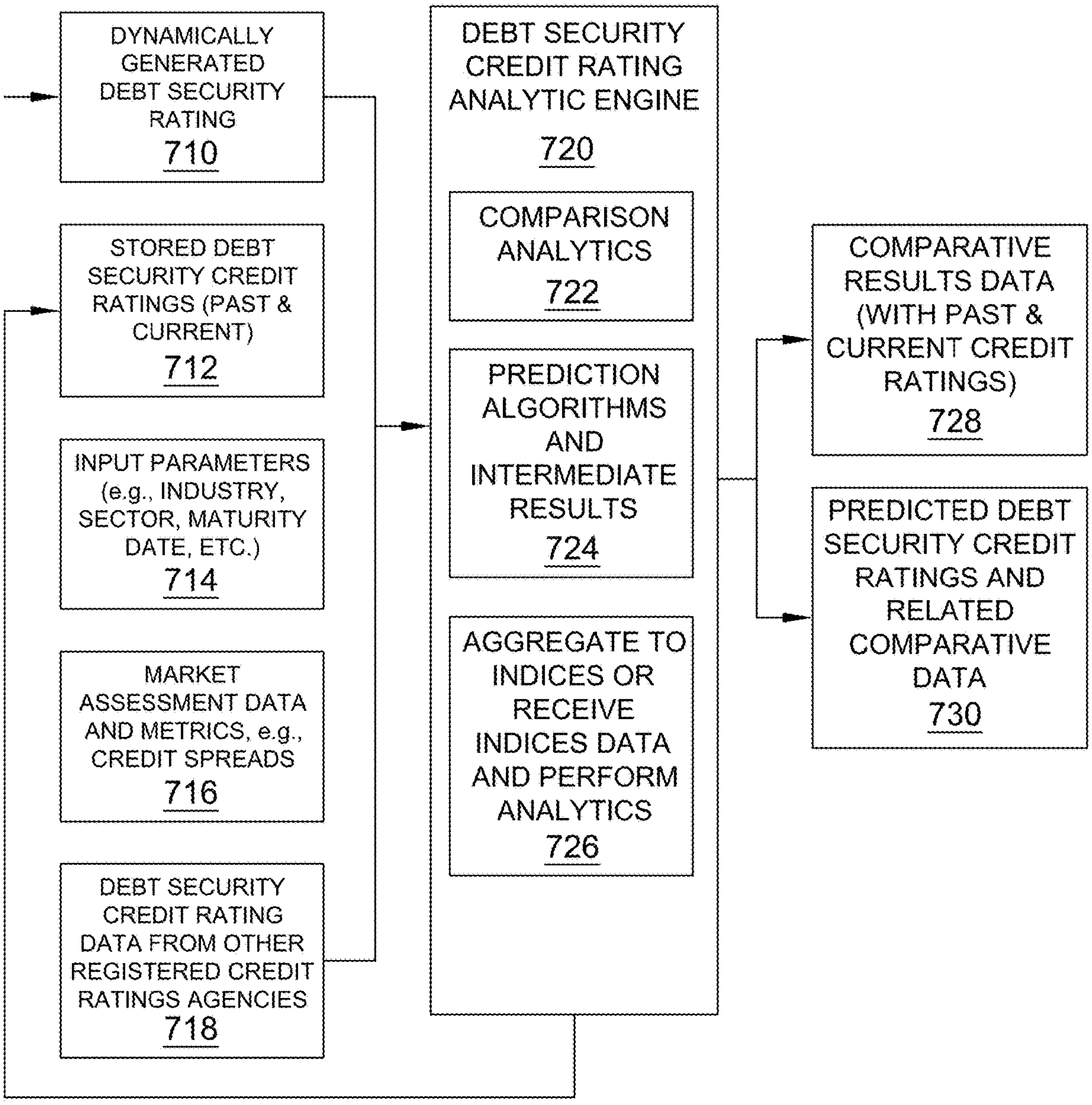
FIG. 7 is a flow diagram for providing high quality, accurate analytic capabilities for a dynamically generated debt security credit risk rating, according to an embodiment.

An embodiment can be understood with reference to FIG. 7, a flow diagram for providing high quality, accurate analytic capabilities for a dynamically generated debt security credit risk rating. A dynamically generated debt security rating 710 is either generated or received and is input into a debt security credit rating analytic engine 720. As well, other debt security related data are input into debt security credit rating analytic engine 720. This other debt security related data include but are not limited to stored debt security credit ratings (past and current) 712; input parameters, e.g., industry, sector, maturity date, etc. 714; market assessment data and metrics, e.g. credit spreads 716; and debt security credit rating data from other registered credit ratings agencies 718. It should be appreciated that data 712-718 can be user-configurable and can be data that are provided by financial institutions to the public. In an embodiment, a user interface is provided (not shown) to enable a user to enter, delete, or modify any of input data 712-718.

In an embodiment, debt security credit rating analytic engine 720 contains a comparison analytics component 722, a prediction algorithms and intermediate results component 724, and an aggregate to indices or receive indices data and perform analytics component 726.

In an embodiment, comparison analytics component 722 provides a variety of comparisons with the received debt security credit rating including but not limited to comparing the dynamically generated debt security credit rating to past debt security credit ratings or predicted future debt security credit ratings. Comparison analytics component 722 can compare the debt security credit rating with credit ratings of other debt securities. For example, the comparison can be among debt securities in the same industry sector. Comparison analytics component 722 can compare the debt security credit rating with market assessments via metrics such as credit spreads. As well, comparison analytics component 722 can compare the rating with ratings from other credit rating agencies. These particular comparisons are by way of example only and are not meant to be limiting.

In an embodiment, prediction algorithms and intermediate results component 724 uses one or more predictive models such as a neural network to evaluate the plurality of historical credit rating data and identify future credit ratings based on learned relationships among known variables.

In an embodiment, aggregate to indices or receive indices data and perform analytics component 726 can aggregate the received dynamically generated debt security credit rating and one or more other credit ratings assigned to one or more other debt securities into a dynamic debt security credit ratings index in real-time. As well, aggregate to indices or receive indices data and perform analytics component 726 can receive a dynamically generated debt security credit ratings index. With the dynamically generated debt security credit ratings index, generated or received, component 726 can perform various analytics. The various analytics can include but are not limited to employing weighting in the index based on various factors, where the weighting is user-configurable.

In an embodiment, debt security credit rating analytic engine 720 outputs comparative results data (with past and current credit ratings) 728 and predicted debt security credit ratings and related comparative data 730. In an embodiment, component 720 generates and outputs an adjusted interest rate required to be paid by the issuer of the debt security, based on the debt security credit rating.

Providing Customizable Business Applications Using Dynamically Generated Debt Security Credit Risk Ratings A system and method are provided that allow financial institutions such as banks, businesses, issuers, or investors to build customized workflows (or scenarios) or uses of dynamically generated debt security credit risk ratings. For example, given a dynamically generated rating, the system and method can compute the capital requirements of the issuing entity based on strict criteria such as regulatory rules and business rules. As another example, given a computed debt security credit risk rating, scenarios can be executed in which underestimated credit risk values or overestimated credit risk values are entered into the system to help determine the impact on the capital requirements of the underlying issuing entity. As another example, a user is able to make an adjustment with the company. For instance, if the credit rating is too low, then a feature within the company can be adjusted so that the company's risk of default becomes lower.

Figure 8:
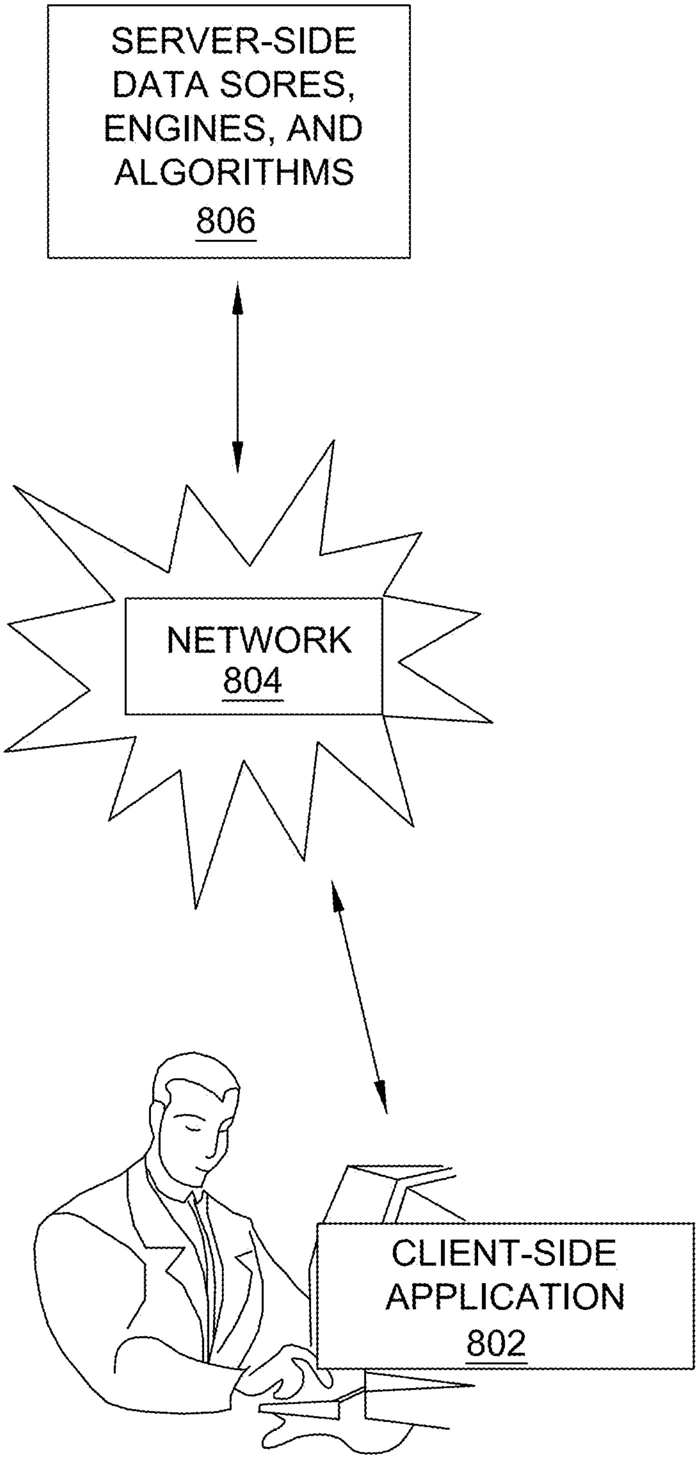
FIG. 8 is a schematic diagram of a system for providing customizable business applications using dynamically generated debt security credit risk ratings, according to an embodiment.

An embodiment can be understood with reference to FIG. 8, a schematic 25 diagram of a system and method for providing customizable business applications using dynamically generated debt security credit risk ratings.

In an embodiment, a user at a client-side application 802 is able to configure a customizable business application that uses the dynamically generated debt security credit ratings provided over a network 804 from server-side data stores, engines, and algorithms 806. It should be appreciated that in an embodiment, network 804 is a cloud network and server-side data stores, engines, and algorithms 806 are hosted on cloud network 804. In this implementation, client-side application 802 can be a web application where part of which are stored on client computer 802, parts may be added as a plug-in to a particular web browser (not shown), or client-side application 802 is just a web browser linking over network 804 to server-side data stores, engines, and algorithms 806. As well, server-side data stores, engines, and algorithms 806 may comprise one or more servers or clusters of servers.

In an embodiment, client-side application 802 is enabled to receive a dynamically generated debt security credit rating for a debt issuer and to enable the user, e.g., of a financial institution, to construct a customized workflow for achieving a desired business result, where the workflow uses the received dynamically generated debt security credit rating. In an embodiment, server-side 806 dynamically generates the debt security credit ratings using the debt security credit risk algorithm as described in FIG. 1. It should be appreciated that when the debt security credit risk algorithm provided herein as described above is used, the credit ratings are provided at a greater level of granularity than those provided from the standard credit rating agencies. Thus, the customizable workflows can be configured to perform at least as many operations as are credit ratings. Thus, because significantly more credit ratings are provided herein than compared to those provided by the standard credit rating agencies, a user is enabled to configure significantly more workflow paths and operations thereon.

In an embodiment, client-side application allows the user to configure a customized workflow that computes and outputs capital requirements of the debt issuer, where the computing is based on regulatory criteria and business rules applicable to the debt issuer (not shown.) The regulatory criteria and business rules can be provided through server-side 806 or can be stored on the client computer. It should be appreciated that capital requirements is by way of example only and is not meant to be limiting. For example, a workflow can be customized that computes and outputs the interest rate that the issuer is required to pay and then proceeds to make a payment. The workflow can be used to help inform a financial institution what it needs to do, e.g. based on rules, depending on the dynamically generated credit rating. For example, the workflow can alert a person within the organization when capital is too low and can cause a credit facility to input more capital to satisfy the requirements of the financial institution.

In an embodiment, the rules and attributes of the workflow are user-configurable. For example, the user can set or enter the attributes that are of important, their respective values and tolerances of their values. Then, the user can also configure the rules that are followed based on the values of the attributes.

In an embodiment, client-side 806 is configured to receive two or more dynamically generated debt security credit ratings for a debt issuer and to enable a financial institution 802 to construct a plurality of customized workflows, each customized workflow using one of the dynamically generated debt security credit rating for a debt issuer, wherein the customized workflows compute underestimated credit risk values or overestimated credit risk values to help determine impacts on the capital requirements. It should be appreciated that the steps may be performed on server-side 806 and client-side 802 accesses server-side 806 via network 804. For purposes of understanding herein, a financial institution is any of a: bank, business, issuer, or investor.

In an embodiment, client-side 802 is configurable so that upon receiving a plurality of dynamically generated debt security credit ratings for a plurality of debt issuers, debt security indices with credit ratings are dynamically generated using the plurality of dynamically generated debt security credit ratings. In an embodiment, the indices are grouped by industry type, credit rating, price, maturity date, and so on. The groupings are user configurable.

In an embodiment, the financial institution 802 is able to define new workflows and modify existing workflows. For example, the user can construct a workflow that tells the user when to issue the new debt when trying to obtain a particular rating as the issuance of the debt may be market-dependent. A workflow can be configured to tell the financial institution it needs to save a particular amount of capital or funds. For example, a workflow can be configured to alert the financial institution when a credit rating rises above a specified threshold so that the financial institution knows it can issue the debt. A workflow can be configured to collect other debt instruments in addition to its underlying debt instrument so that the financial institution can determine where its debt instrument falls within the others in an index. These details are all illustrative and are not meant to be limiting as many other workflows can be constructed using the dynamically generated credit rating as described herein.

In an embodiment, the customized workflow determines an interest rate that an issuer is required to pay based on the dynamically generated debt security credit rating.

In an embodiment, based on the dynamically generated debt security credit rating, the customized workflow allows constructing scenarios that increase the credit rating to lower interest payments and other financing costs.

In an embodiment, the customized workflow allows a user to compute capital flows due by making changes to the dynamically generated debt security credit rating and allows a user to make changes to the capital flows to compute an updated dynamically generated debt security credit rating.

Dynamic Bond Rating Services and Customer Interface

A variety of techniques are provided that facilitate and provide dynamic and real-time bond rating services to customers and investors. It should be appreciated that the use of bond is not meant to be limiting but is meant for illustrative purposes only. Other debt securities such as mortgage-backed securities are included as well.

An embodiment can be understood with reference to FIGS. 9A-9D, tables of bond portfolios and corresponding bond attributes used as input into a dynamic bond rating service and the respective output tables. For Table 9A, a user interface of a dynamic bond credit rating system such as that in FIG. 1 is provided for customers to input bond portfolio information for a corresponding bond portfolio. The bond portfolio information can include but is not limited to bond attribute values for the bonds such as price. Then, responsive to receiving the bond portfolio information, the system applies the received bond portfolio information to a dynamic bond credit rating algorithm that dynamically generates the bond credit ratings for each bond of the portfolio. Then the credit ratings are output, e.g., in a table such as that shown in FIG. 9B.

The dynamic bond rating services and customer interface described herein can be useful to investors or analysts wanting an optimal understanding of the composition of their bond portfolio as well as the quantified exposure of their bond portfolio.

In an embodiment, the system contains a bond rating analytics engine that computes and outputs related bond analytics and bond portfolio analytics. The types of bond analytics generated and outputted are user-configurable as not all analytics are desired by the same individuals. The particular analytics need not be described herein as many standard bond analytical functions are readily available in the market or are known in the industry.

In an embodiment, the related bond analytics and bond portfolio analytics comprise trend data of a specified attribute over a specified time period. An example is shown in FIG. 9C. Bond A shows a 1% change in a year. Bond B shows no change over the year, while Bond C shows a 50% change. The attribute whose change is being tracked can be the dynamic credit rating or any other specified attribute. The specified attribute and the specified time period are user-configurable.

In an embodiment, an interface is provided for a user or an automated process to input credit ratings of one or more standard credit rating agencies. The embodiment includes a conversion engine that converts the dynamically generated bond credit ratings to the corresponding credit ratings of the one or more standard credit rating agencies. For example, in FIG. 9D, the dynamically generated credit rating of Bond C is 3, which is converted by the conversion engine to BBB for S&P. However, in the example, the actual credit rating given by S&P is AAA. Thus, by this example, it is shown that using the invention herein, an investor gleans more insight into a bond. That is, in this example, Bond C appears to be robust, holding a AAA rating. However, using the dynamic bond credit rating algorithm herein, the credit rating for the bond maps to a lower equivalent S&P bond rating. This inconsistent information can assist the investor, analyst, or any other interested user in making a more informed decision regarding whether to hold onto Bond C or to sell it and get it out of the bond portfolio.

Figure 10:
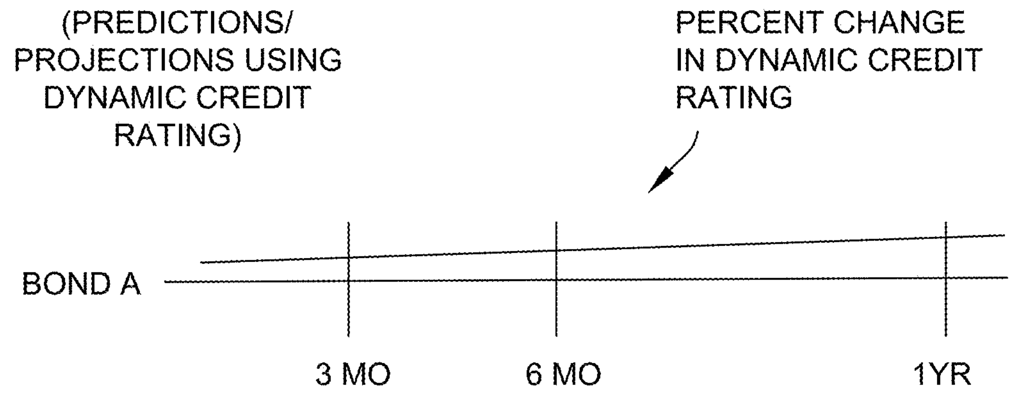
FIG. 10 is a schematic diagram showing the percent change in the dynamic credit rating for Bond A, according to an embodiment.

An embodiment can be understood with reference to FIG. 10, a schematic diagram showing the percent change in the dynamic credit rating for Bond A. In this embodiment, a user interface is provided to allow a user to configure input prediction parameters for one or more bonds. In the example in FIG. 10, the user chose time intervals of 3 months, 6 months, and 1 year for seeing any change in the attribute, dynamic credit rating. In the embodiment, a graph is generated which plots the percentage change in the dynamic credit rating over the specified time intervals. Thus, at a glance, the user can see an upward trend or increase in the credit rating for Bond A. It should be appreciated that when using the granular credit rating system described herein, the graph shows change that might not be detected when plotting the bond credit ratings as computed by the standard credit rating agencies. Thus, the granularity of the dynamic bond credit rating system allows a user to make a more informed decision regarding his or her held bonds.

Exemplary Carbon Credit Marketplace System

Figure 11:
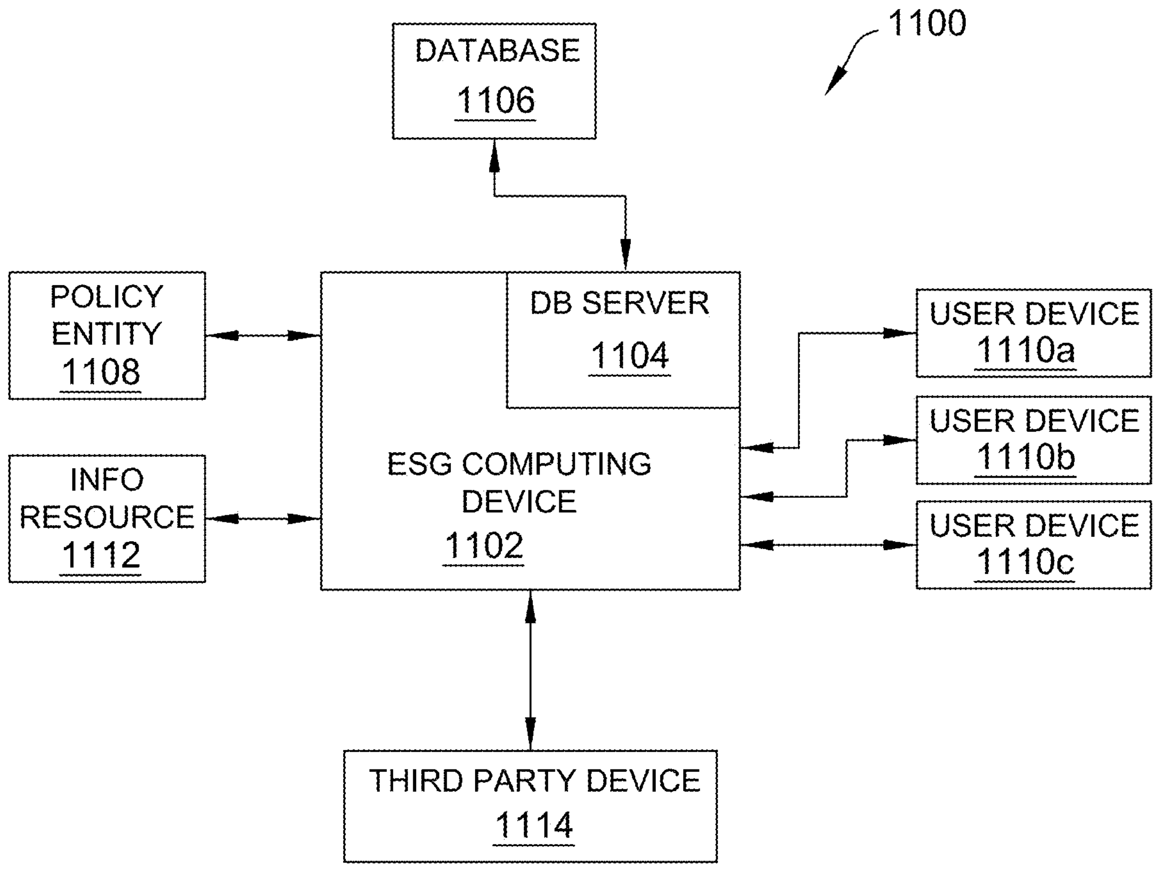
FIG. 11 is block diagram of a Carbon Credit Marketplace (CCM) system, according to an embodiment.

FIG. 11 depicts an exemplary Carbon Credit Marketplace (CCM) system 1100. CCM system 1100 may include a CCM computing device 1102. CCM computing device 1102 may include a database server 1104 and may be in communication with, for example, a database 1106, a policy entity device 1108, an information resource device 1112, a third-party device 1114, and one or more user devices 1110*a*-1110*c*. User devices 1110*a*-1110*c* may be, for example, mobile devices, tablet PCs, portable computers, or the like. In some embodiments, CCM computing device 1102 may be associated with, for example, a marketplace providing a platform to exchange carbon credit certificates, offsets, or the like between different entities, such as governmental entities, organizations, individuals, or the like. In some embodiments, one or more attributes may be attributed to carbon credits. For example, credit or offset, or carbon category, or a combination thereof. Carbon credits may be categorized into categories including, but limited to, nature loss (e.g., deforestation), nature-based sequestration (e.g., reforestation), avoidance or reduction of emissions (e.g., reduction of methane from landfills), and technology-based removal of carbon dioxide from the atmosphere.

CCM computing device 1102 may receive user demographic data, regional data, location information, carbon offset data, carbon credit data, enterprise data, and/or market data from one or more user devices 110*a*-110*c*. A typical user device, or client device, may include components for capturing and generating data, such as a GPS device, a sensor, an accelerometer, a gyroscope, and/or any other device capable of capturing data. CCM computing device 1102 may use the received to develop carbon credit offset data, or the like. Developed data may be stored on database 1104, for example. Database 1104 may be implemented as a local storage option. Alternatively, database 1104 may be a remote storage location, such as a cloud storage option or a distributed storage option.

User devices 1110*a*-1110*c* may be equipped with, for example, a GPS device. A GPS device may utilize GPS techniques to determine a measurement of geographic coordinates of the corresponding user device. Because some factors (e.g., atmospheric effects) may reduce the precision of a GPS device, the GPS device may return, for example, an error estimate along with the measured geographic location. The measured geographic location and error estimate may provide an area (e.g., a radius around the measured geographic location) where the corresponding user device may be located with an associated probability.

User devices 1110*a*-1110*c* may also be equipped with, for example, an accelerometer and/or a gyroscope. An accelerometer may be capable of measuring a linear and/or angular acceleration of the corresponding user device at a given moment in time. A gyroscope may be capable of determining an orientation of the user device. Accordingly, an accelerometer and a gyroscope together may be used to determine a direction of acceleration of the user device. Data generated by an accelerometer and a gyroscope may be used (e.g., by CCM computing device 1102 or one of user devices 1110*a*-1110*c*) to generate movement and positioning data (e.g., a location, orientation, acceleration, velocity, etc.) of the corresponding user device. Such movement and positioning data may be used by CCM computing device 1102, for example, to generate a profile of an entity including certain data, such as location (e.g., municipality, state) and compliance with regulations (e.g., exhaust, offset, etc.).

In some embodiments, CCM computing device 1102 may receive entity demographics data. For example, CCM computing device 1102 may collect entity demographics data from one or more of user devices 1110*a*-1110*c* via email or via a mobile application running on one of user devices 1110*a*-1110*c*. An entity may be prompted to respond to a series of questions for self-identification purposes to enroll with a carbon credit trading platform implemented by CCM computing device 1102. Questions may include, but are not limited to, company size, location, carbon capture and offset data, projected offsets, historical carbon offset data, compliance and regulation data, types of carbon emissions, climate data, footprint data, or the like. Entity responses may be compiled and saved as part of an entity's profile. Additionally, or alternatively, entity responses may be used for platform registration purposes. Types of carbon emissions or captured data may include, but is not limited to, wetlands, trees/timber, fossil fuels (e.g., oil or gas), or the like.

In some embodiments, CCM computing device 1102 may receive regulation compliance data from one or more of user devices 1110*a*-1110*c*. For example, after a user has registered an entity with the platform, compliance and regulation data may be transmitted via a portal of the CCM computing device 102, such as a mobile application or desktop web application. Compliance and regulation data may include, but is not limited to, captured data (e.g., emissions data captured by one or more sensors), or other data used to provide compliance with government regulations. Such information may be collected and stored in a database, such as database 1104, by CCM computing device 1102. Collected data may be indexed and analyzed in view of other data collected of system users or entities, such as demographics data and carbon credit data as disclosed herein. In some embodiments, the collected data may be considered internal index data.

In additional embodiments, CCM computing device 1102 may receive index data, or external index data, from index computing devices, or servers, 1108 and 1112. Index devices may be an information resource 1112 that provides certain external index data including, but not limited to, carbon credit offset data, compliance data, and governmental regulation data. Such external data indexes may be collected individually by CCM computing device 1102 and analyzed to provide an overall index, or collective index. In some embodiments, collected index data from index devices 1108 and 1112 may be compared or taken in combination with one or more internal indexes. In some embodiments, CCM computing device 1102 may be configured to create a platform to exchange carbon offset credits based on one index or a collection of indexes acting as underlying indexes. Additionally, or alternatively, policy entity 1108 or info resource 1112 may provide carbon credit certificate attribute data.

In some embodiments, CCM computing device 1102 may receive carbon credit information described herein from a third-party, such as third-party device 1114. An entity associated with the third-party device 1114 may include, but is not limited to an auditing firm, or the like. An auditing firm may, for example, ensure compliance of carbon credit/offset usage, or the like. Additionally, or alternatively, an auditing firm may actively prevent carbon credit abuse by certificate holders and provide proposed legislation or regulations to ensure proper carbon credit issuance and trading thereof in certain markets.

The systems, devices, and methods disclosed herein, such as CCM computing device 1102, may help support the reduction or elimination of carbon emissions by protecting the integrity of the climate derivatives markets by providing insights into how the carbon derivatives markets trade and function. More particularly, the disclosed systems, devices, and methods may provide insights into how the primary, secondary, and derivative carbon markets are interacting and may be used to meet compliance obligations, manage risks, and set pricing, as described in more detail below.

Exemplary Client Computing Device

Figure 12:
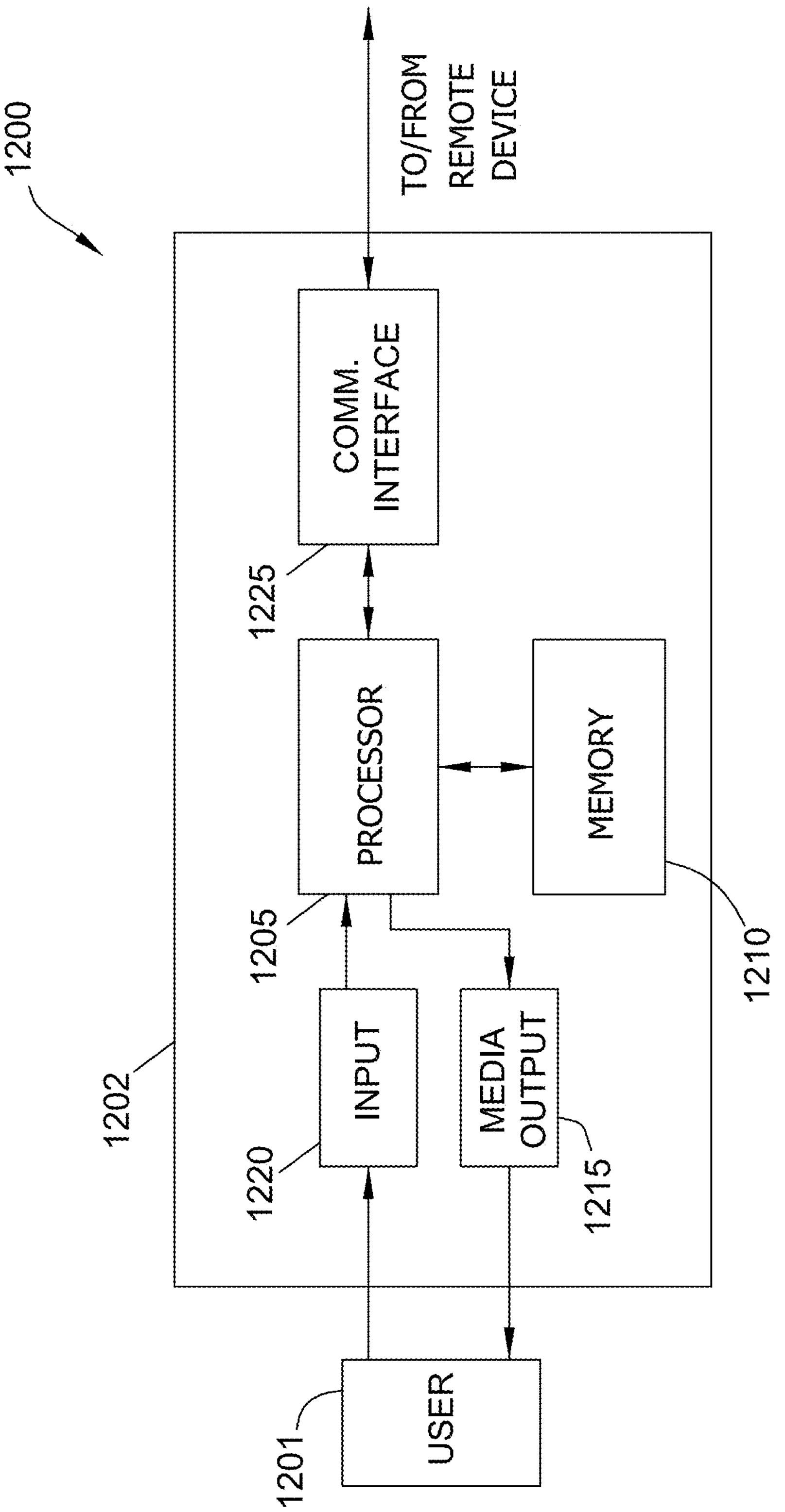
FIG. 12 is a block diagram of a client computing device that may be used with the CCM system illustrated in FIG. 11, according to an embodiment.

FIG. 12 depicts a block diagram 1200 of an exemplary client computing device 202 that may be used with the Carbon Credit Marketplace (CCM) computing system 1100 shown in FIG. 11. Client computing device 1202 may be, for example, at least one of CCM computing device 1102, user devices 1110*a*-1110*c*, or even a third-party device 1114 (shown in FIG. 1).

Client computing device 1202 may include a processor 1205 for executing instructions. In some embodiments, executable instructions may be stored in a memory area 1210. Processor 1205 may include one or more processing units (e.g., in a multi-core configuration). Memory area 1210 may be any device allowing information such as executable instructions and/or other data to be stored and retrieved. Memory area 1210 may include one or more computer readable media.

In one or more exemplary embodiments, computing device 1202 may also include at least one media output component 1215 for presenting information a user 1201. Media output component 1215 may be any component capable of conveying information to user 1201. In some embodiments, media output component 1215 may include an output adapter such as a video adapter and/or an audio adapter. An output adapter may be operatively coupled to processor 1205 and operatively coupled to an output device such as a display device (e.g., a liquid crystal display (LCD), a light emitting diode (LED) display, an organic light emitting diode (OLED) display, a cathode ray tube (CRT) display, an "electronic ink" display, a projected display, etc.) or an audio output device (e.g., a speaker arrangement or headphones). Client computing device 1202 may also include an input device 1220 for receiving input from a user 1201. Input device 1220 may include, for example, a keyboard, a pointing device, a mouse, a stylus, a touch sensitive panel (e.g., a touch pad or a touch screen), or an audio input device. A single component, such as a touch screen, may function as both an output device of media output component 1215 and an input device of input device 1220.

Client computing device 1202 may also include a communication interface 1225, which can be communicatively coupled to a remote device, such as computing device 1102 of FIG. 1. Communication interface 1225 may include, for example, a wired or wireless network adapter or a wireless data transceiver for use with a mobile phone network (e.g., Global System for Mobile communications (GSM), 3G, 4G, or Bluetooth) or other mobile data networks (e.g., Worldwide Interoperability for Microwave Access (WIMAX)). The systems and methods disclosed herein are not limited to any certain type of short-range or long-range networks.

Stored in memory area 1210 may be, for example, computer readable instructions for providing a user interface to user 1201 via media output component 1215 and, optionally, receiving and processing input from input device 1220. A user interface may include, among other possibilities, a web browser or a client application. Web browsers may enable users, such as user 1201, to display and interact with media and other information typically embedded on a web page or a website.

Memory area 1210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAN). The above memory types are exemplary only and are thus not limiting as to the types of memory usable for storage of a computer program.

In the exemplary embodiments, processor 1205 may include and/or be communicatively coupled to one or more modules for implementing the systems and methods described herein.

In exemplary embodiments, client computing device 1202 may also include at least one media output component 1215 for presenting information to a user 1201. Media output component 1215 may be any component capable of conveying information to user 1201. In some embodiments, media output component 1215 may include an output adapter such as a video adapter and/or an audio adapter. An output adapter may be operatively coupled to processor 1205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones). Media output component 1215 may be configured to, for example, display an alert message identifying a statement as potentially false.

Client computing device 1202 may also include an input device 1220 for receiving input from user 1201. Input device 1220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 1215 and input device 1220.

Client computing device 1202 may also include a communication interface 1225, which can be communicatively coupled to a remote device, such as computing device 1102 (shown in FIG. 11). Communication interface 1225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 1210 may be, for example, computer-readable instructions for providing a user interface to user 1201 via media output component 1215 and, optionally, receiving and processing input from input device 1220. A user interface may include, among other possibilities, a web browser and client application. Web browsers may enable users, such as user 1201, to display and interact with media and other information typically embedded on a web page or a website.

Memory area 1210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM).

The above memory types are exemplary only, and are thus not limiting as to the types of memory usable for storage of a computer program.

Exemplary Server System

Figure 13:
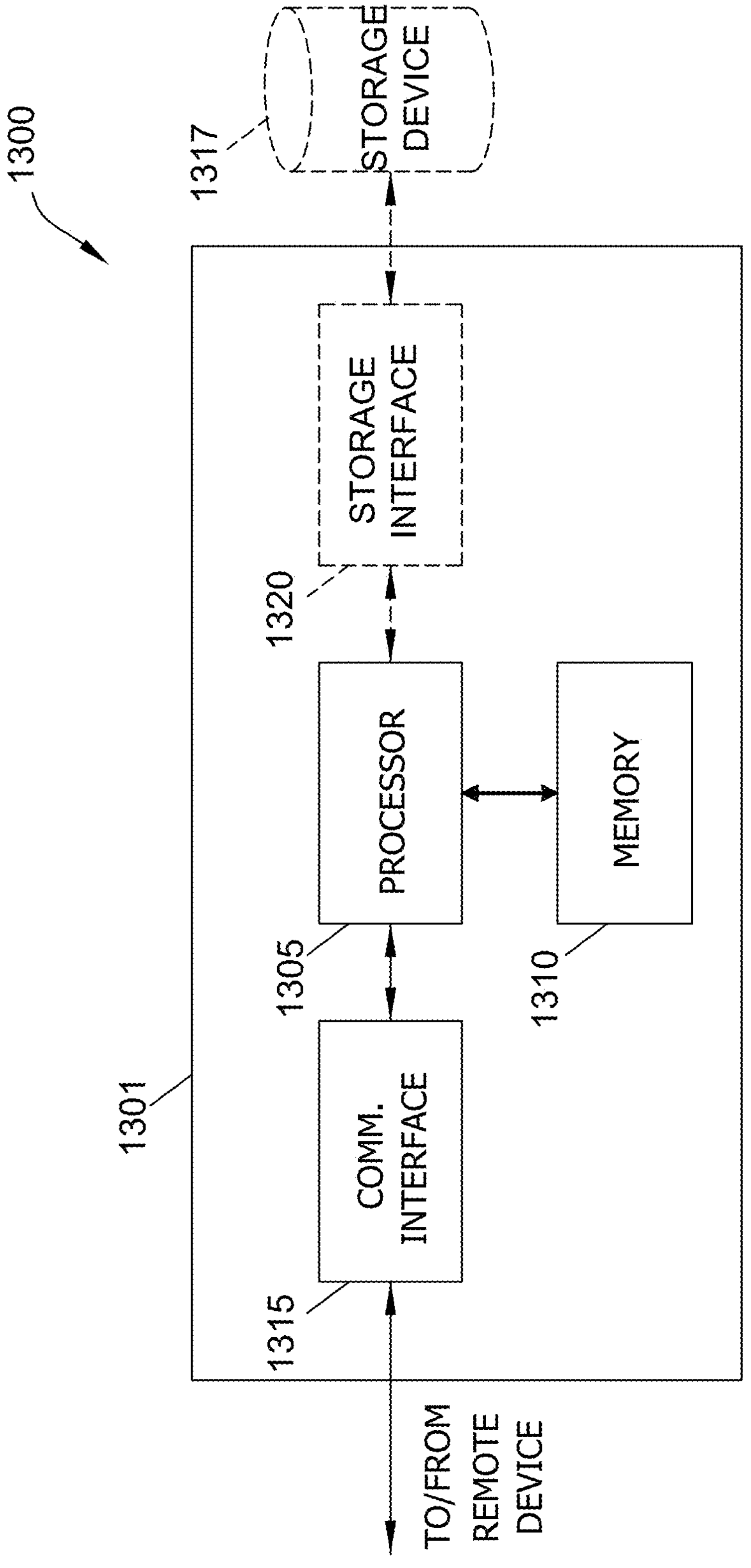
FIG. 13 is a block diagram of a server device that may be used with the CCM system illustrated in FIG. 11, according to an embodiment.

FIG. 13 depicts a block diagram 1300 showing an exemplary server system 1301 that may be used with computing system 1100 illustrated in FIG. 1. Server system 1301 may be, for example, server computing device 1102 (shown in FIG. 11).

In exemplary embodiments, server system 1301 may include a processor 1305 for executing instructions. Instructions may be stored in a memory area 1310. Processor 1305 may include one or more processing units (e.g., in a multi-core configuration) for executing instructions. The instructions may be executed within a variety of different operating systems on server system 1301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 1305 may be operatively coupled to a communication interface 1315 such that server system 1301 can communicate with, for example, computing device 1102 and user devices 1110*a*-1110*c* (shown in FIG. 11), and/or another server system. For example, communication interface 1315 may receive data from one or more user devices 1110*a*-1110*c* via the Internet.

Processor 1305 may also be operatively coupled to a storage device 1317, such as database 1106 (shown in FIG. 11). Storage device 1317 may be any computer-operated hardware suitable for storing and/or retrieving data. In some embodiments, storage device 1317 may be integrated in server system 1301. For example, server system 1301 may include one or more hard disk drives as storage device 1317. In other embodiments, storage device 1317 may be external to server system 1301 and may be accessed by a plurality of server systems. For example, storage device 1317 may include multiple storage units such as hard disks or solid-state disks in a redundant array of inexpensive disks (RAID) configuration. Storage device 1317 may include a storage area network (SAN) and/or a network attached storage (NAS) system.

In some embodiments, processor 1305 may be operatively coupled to storage device 1317 via a storage interface 1320. Storage interface 1320 may be any component capable of providing processor 1305 with access to storage device 1317. Storage interface 1320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1305 with access to storage device 1317.

Memory area 1310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer system.

In exemplary embodiments, server system 1301 may include a processor 1305 for executing instructions. Instructions may be stored in a memory area 1310. Processor 1305 may include one or more processing units (e.g., in a multi-core configuration) for executing instructions. The instructions may be executed within a variety of different operating systems on server system 1301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 1305 may be operatively coupled to a communication interface 1315 such that server system 1301 is capable of communicating with other computing devices, such as computing device 1102 or user devices 1110*a*-1110*c* (shown in FIG. 11), and/or another server system 1301. For example, communication interface 1315 may receive data from one or more client user devices 1110*a*-1110*c* via the Internet.

Processor 1305 may also be operatively coupled to a storage device 1317, such as database 1120 (shown in FIG. 11). Storage device 1317 may be any computer-operated hardware suitable for storing and/or retrieving data. In some embodiments, storage device 1317 may be integrated in server system 1301. For example, server system 1301 may include one or more hard disk drives as storage device 1317. In other embodiments, storage device 1317 may be external to server system 1301 and may be accessed by a plurality of server systems 1301. For example, storage device 1317 may include multiple storage units such as hard disks or solid state disks in a redundant array of inexpensive disks (RAID) configuration. Storage device 1317 may include a storage area network (SAN) and/or a network attached storage (NAS) system.

In some embodiments, processor 1305 may be operatively coupled to storage device 1317 via a storage interface 1320. Storage interface 1320 may be any component capable of providing processor 1305 with access to storage device 1317. Storage interface 1320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 1305 with access to storage device 1317.

Memory area 1310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Process for Dynamically Generating Carbon Credit Ratings

Figure 14:
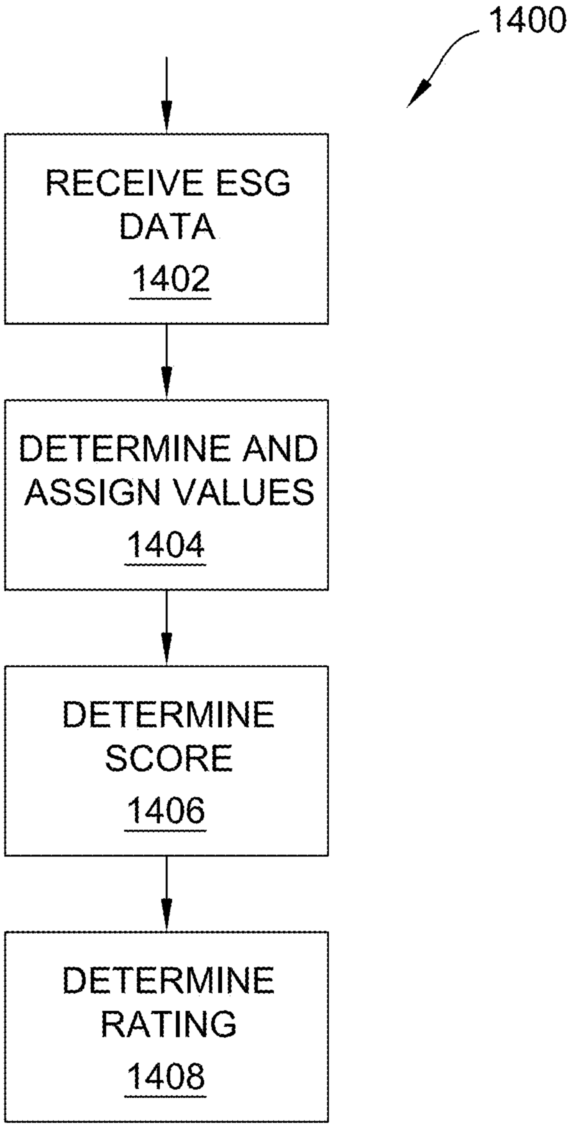
FIG. 14 is a flow diagram for dynamically generating carbon credit ratings, according to an embodiment.

FIG. 14 is a flow diagram 1400 of at least one embodiment of dynamically generating carbon credit ratings. In block 1402, carbon credit information pertaining to a certain type of carbon credit, or offset, is received. The carbon credit information may include, but it not limited to, carbon credit value, historical carbon credit certificate issuance data, carbon offset purchase data, government compliance data, carbon offset data, and structured and unstructured carbon credit related data from disparate sources including but not limited to general economic data sources, government data sources, technological data sources, and proprietary data sources. In some embodiments, a computing device may receive the carbon credit information, like CCM device 1102 shown in FIG. 11. In block 1404, a value of the carbon credit certificate is determined and assigned to the carbon credit. In block 1406, based on the assigned value, a score is assigned to the carbon credit using a carbon credit pricing algorithm. Finally, in block 1408, based on the determined score, a rating is applied to the carbon credit. Once a rating is applied, a price may be determined for the carbon credit and may then be sold, such as via a marketplace, or the like, for a fair prices.

Exemplary Risk Management Clearinghouse for Carbon Credits

In an embodiment, an automated risk management clearinghouse (RMC) system maintains a database relating carbon credit information and/or scores with potential risk for a company. The RMC system may be accessed directly or tied into front end or backend systems to automatically monitor transactions involving carbon credit certificates. The potential risk may be based upon criteria such as risk advisories, historical data, and/or other any variable that can affect risk.

Information generated by an RMC may be utilized to generate a risk quotient or other rating related to risk, quality, etc., based upon a weighted carbon credit risk algorithm applied to the criteria, wherein the risk quotient is indicative of risk associated with a carbon credit. The quotient may be monitored on a periodic basis, during the course of a transaction involving the carbon credit, or on demand. Therefore, carbon credit risk may not only be calculated at the time of transacting, but may be calculated on an ongoing basis so risk may be assessed at any given time. Actions commensurate with a risk quotient can be presented to a company to help the company properly manage risk associated with a carbon credit.

In an embodiment, a log or other stored history may be created such that utilization of the system may mitigate adverse effects relating to problematic carbon credits. Mitigation may be accomplished by demonstrating to regulatory bodies, shareholders, news media, and other interested parties that corporate governance is being address through tangible risk management processes.

Figure 15:
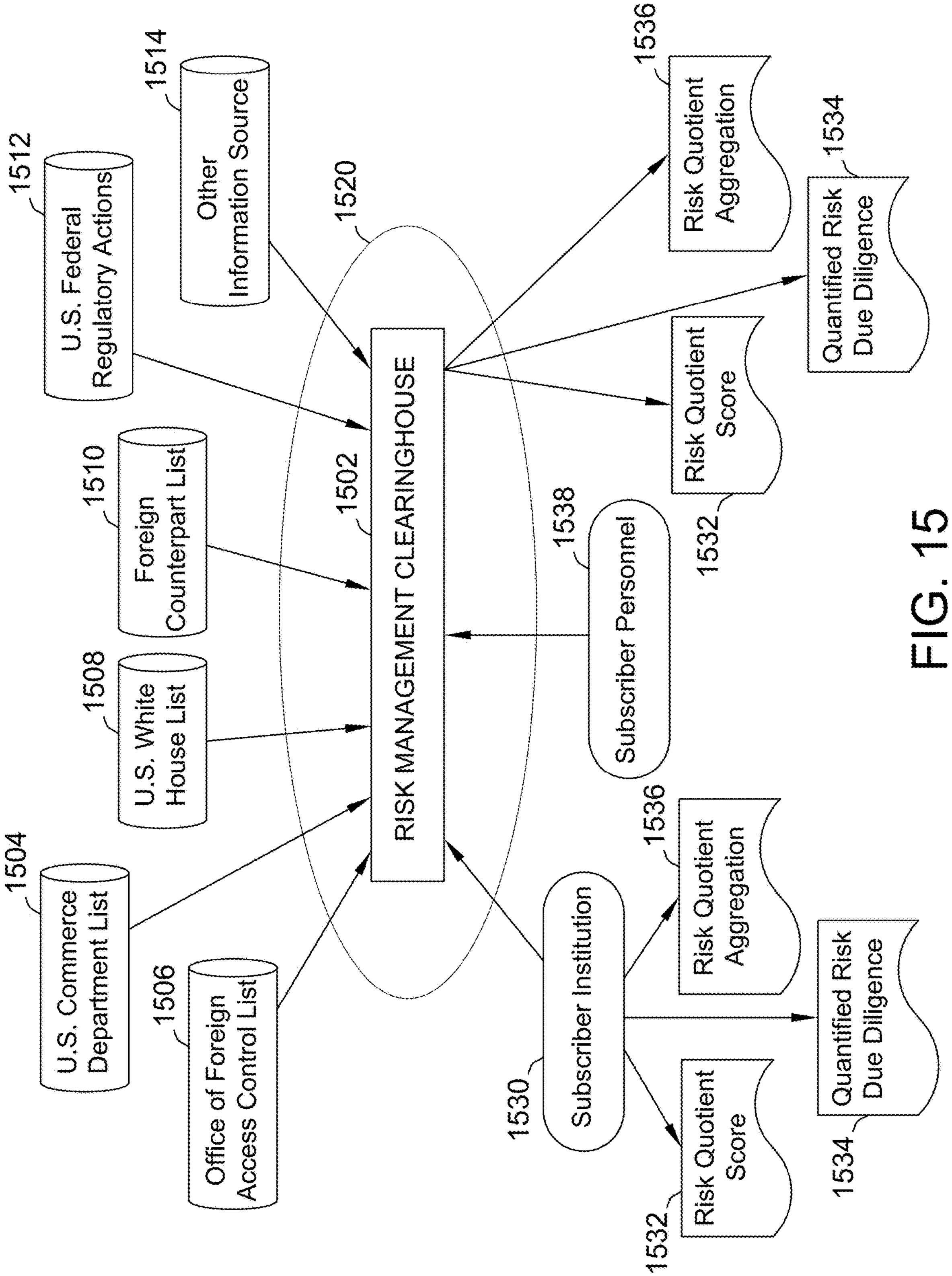
FIG. 15 is a block diagram of an automated risk management clearinghouse (RMC) system, according to an embodiment.

Referring to FIG. 15, a block diagram of an RMC system is illustrated. An RMC system 1502 may receive carbon credit information. RMC system 1502 may include or comprise CCM computing device 1102 (shown in FIG. 11). Carbon credit information may be received from general economic data sources, technological data sources, government data sources, proprietary data sources, subscribers, and/or other sources and fed into one or more models which determine risk profiles, quantifications (e.g., pricing), and/or risk ratings. The information is constantly updated and related to carbon credits in order to facilitate compliance with regulatory requirements. In other words, this information may comprise real-time, actual information to dynamically determine risk profiles, quantifications, and/or risk ratings, thereby providing a more accurate and holistic assessment of the risks, quality, pricing, etc. of a carbon credit, thereby protecting the integrity of the carbon trading markets, and in turn, helping to combat climate change.

A subscriber may include, but is not limited to: a securities broker, retail bank, commercial bank, investment and merchant bank, private equity firm, asset management company, mutual fund company, hedge fund firm, insurance company, credit card issuer, retail and commercial financier, securities exchange, other Regulator, money transfer agency, end buyers, or other entities. Information supplied by a subscriber may be information gathered according to normal course. of dealings with a particular entity. Information received from a subscriber may be subject to applicable law including privacy laws, wherein safeguards can be put in place to prevent such information from being made available to other entities. In addition, a financial institution, or other subscriber may discover or suspect that a person or entity is involved in some fraudulent or otherwise illegal activity and report this information to the RMC system 1502.

A decision by a company concerning whether to purchase a carbon credit may be dependent upon many factors. A multitude and diversity of risks related to the factors may need to be identified and evaluated. In addition, the weight and commercial implications of the factors and associated risks can be interrelated. RMC system 1502 may provide a consistent and uniform method for business, legal, compliance, credit, and other personnel of companies to identify and assess risks associated with a carbon credit. RMC system 1502 allowed carbon credit risks to be identified, correlated and quantified by companies, thereby assessing legal, regulatory, financial, and reputation exposure.

Financial institutions are closely regulated. As a result, financial institutions are exposed to significant risks from their obligations of compliance with the law and to prevent, detect, and at times, report potential violations of laws, regulations, and industry rules. These risks include, but are not limited to, the duty to disclosed information and to prevent and possibly report fraud, money laundering, foreign corrupt practices, bribery, embargoes, sanctions, and the like. Through a series of structure questions and weighting of information received as answers, financial institutions can structure a risk exposure and receive suggested response to a specific risk scenario.

A financial institution or company can integrate RMC system 1502 as part of legal and regulatory oversight for various due diligence and "know your customer" obligations imposed by regulatory authorities. RMC system 1502 can facilitate detecting the legitimacy of a carbon credit. RMC system 1502 may also support a financial institution's effort to meet requirements regarding the maintenance of accurate books and records relating to their financial transactions and affirmative duty to disclose material issues affecting an investor's decisions.

An institution that may implement, or make use of the present invention can include an investment bank, a merchant bank, a commercial bank, a security firm, an asset management company, a hedge fund, a mutual fund, a credit rating agency, a security exchange and bourse, an institutional or individual investor, an auditing firm, a law firm, a trading institution, an insurance company, a credit card issuer, a trading exchange, a government regulator, a law enforcement agency or other institution who may be involved with financial transactions. Similarly, financial investments can include investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions.

A log or other stored history can be created such that utilization of the system can mitigate adverse effects relating to a problematic account. Mitigation can be accomplished by demonstrating to regulatory bodies, shareholders, news media and other interested parties that corporate governance is being addressed through tangible risk management processes. An implementing institution may include, for example, a bank, a trading institution, an insurance company, a credit card issuer, a trading exchange, a government regulator or a law enforcement agency.

Information relating to financial, legal, regulatory and/or reputational risk is received into a computer system. The computer system applies a carbon credit risk algorithm that weights the input information and calculates a risk quotient or similar rating. The risk quotient can include a scaled numeric or alpha-numeric value.

If an account reaches or exceeds a risk quotient threshold, RMC system 1502 responds with a predetermined action. Actions can include, for example, generating an alert, blocking acceptance of a transaction, creating a report, notifying a compliance department, or other appropriate response. In addition, the system can create a structured history relating to a new account that can demonstrate due diligence and proper corporate governance. Reporting can be generated from the structured history.

In the case of an automated transaction, such as, for example, execution of an online transaction, a direct feed of information can be implemented from a system involved in the transaction to RMC system 1502 or via questions presented to a transaction initiator by a programmable robot via a GUI. Questions can relate to a particular type of account, a particular type of client, types of investment, or other criteria. Other prompts or questions can aid a financial institution ascertain the identity of an account holder and an account's beneficial owner. If there is information indicating that a proposed transaction is related to an account that is beneficially owned by a high risk entity, the financial institution may not wish to perform the transaction if it is unable to determine the identity of the high risk entity and his or her relationship to the account holder.

RMC system 1502 can also receive open queries, such as, for example from subscriber personnel 1538, wherein the query may or may not necessarily be associated with a particular carbon credit. The results of the query would contain information relating to an individual or circumstance associated with the query. The results may also provide historical data, world event information and other targeted information to facilitate a determination regarding an at risk entity's source of wealth or information related to particular funds involved with a carbon credit in consideration.

A query can be automatically generated from monitoring carbon credits being traded or managed by a subscriber institution 1530. For example, an information system involved in a transaction can be electronically scanned for key words, entity names, geographic locales, or other pertinent data. A query can be formulated according to the pertinent data and run against a database maintained RMC system 1502. Other methods of query can include voice queries via a telephone or other voice line, such as voice over internet, fax, electronic messaging, or other means of communication. Query can also include direct input into RMC system 1502, such as through a graphical user interface (GUI) with input areas or prompts.

Questions and/or prompts proffered by RMC system 1502 can also depend from previous information received. Queries and information generally received, or received in response to targeted questions, can be input into RMC system 1502 from which it can be utilized for real time risk assessment and generation of an RMC risk quotient 1532, quantified risk due diligence 1534, and risk quotient aggregation 1536.

An alert list containing 1502 and/or terms of interest to a subscriber can be supplied to RMC system 1502 by a subscriber or other interested party. Each list can be customized and specific to a specific subscriber. RMC system 1502 can continually monitor data in its database via an alert query with key word, fuzzy logic or other search algorithms and transmit related informational data to the interested party. In this manner, ongoing diligence can be conducted. In the event that new information is uncovered by the alert query, the subscriber can be immediately notified, or notified according to a predetermined schedule. Appropriate action can be taken according to the information uncovered.

A risk assessment or risk quotient 1532 can be made available by the RMS system 106 or a financial institution 1530. In one embodiment, the risk quotient can be made assessed in real time. A real time assessment can allow financial institution 1530 to provide a suggested action, which can be taken to address a particular risk quotient. A suggested action may include; for example, limiting the scope of a transaction entered into, discontinuing a transaction associated with high-risk participants, notifying authorities, or other appropriate actions.

RMC system 1502 can quantify risk due diligence 1534 by capturing and storing a record of information received, queries executed and actions taken relating to a carbon credit. Once quantified, the due diligence data can be utilized for presentation to regulatory bodies, shareholders, news media and/or other interested parties, to mitigate adverse effects relating to a problematic carbon credit. The data can demonstrate that corporate governance is being addressed through tangible risk management processes. RMC system 1502 or financial institution 1530 can also aggregate risk quotient scores 1532 to assess a level of risk being tolerated by financial institution 1530. Other calculations, such as, for example, the sum, mean, average, or other calculation can be made to further analyze risk. If desired, a rating can be applied to an institution according to the amount of risk tolerated by the institution, such as, for example, the average risk tolerated.

Figure 16:
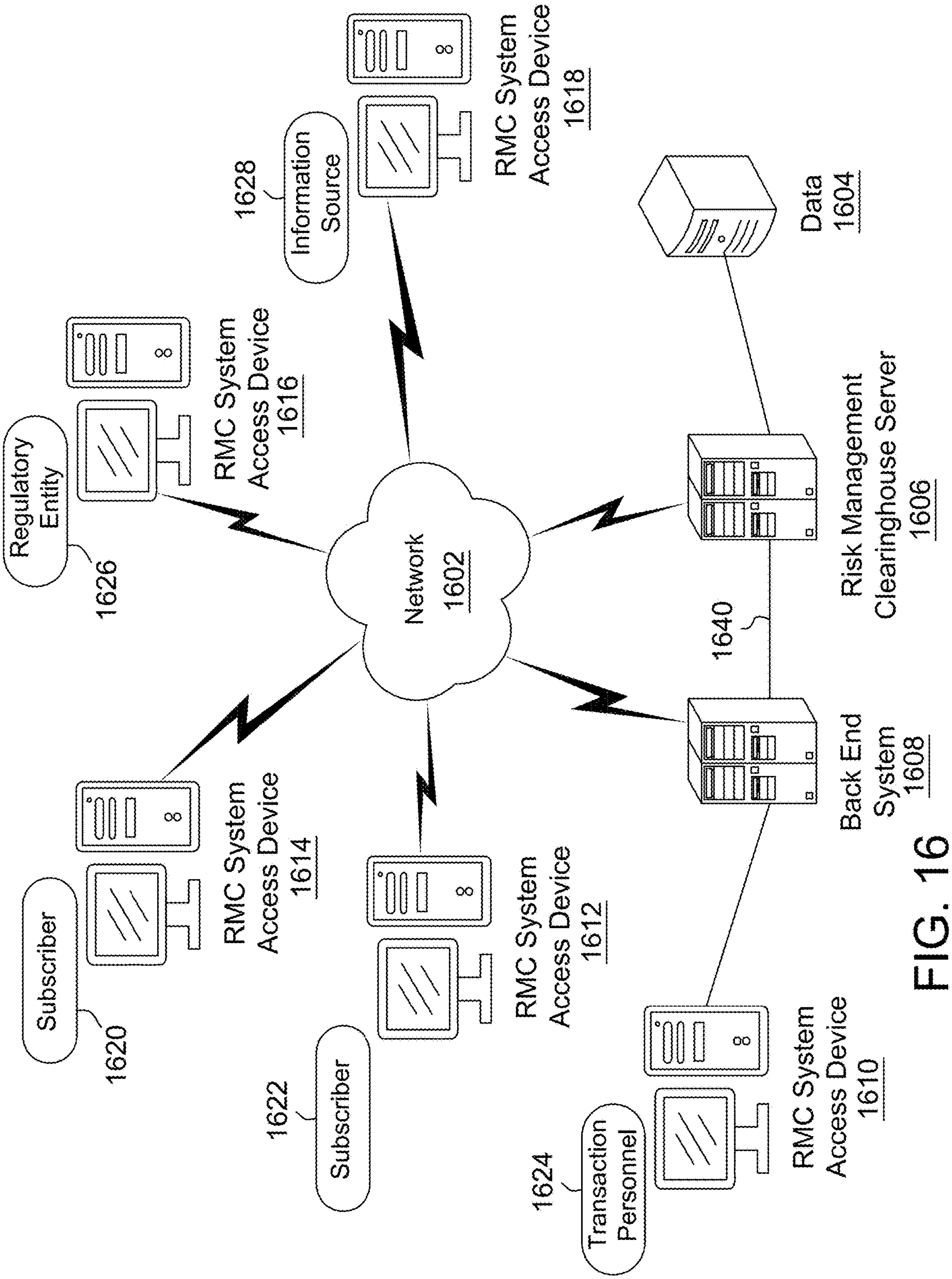
FIG. 16 is a schematic diagram of a network associated with an RMC system, according to an embodiment.

Referring now to FIG. 16, a schematic diagram of a network associated with an RMC system is illustrated. An automated RMC system 1502 can include a computerized RMC server 1606 accessible via a direct connection 1640 or via a distributed network 1602 such as the Internet, or a private network. A subscriber 1620, 1622, regulatory entity 1626, information source 1628, transaction personnel 1624, or other party interested in RMC risk management, can use a computerized system or network access device 1610-1618 to receive, input, transmit or view information processed in the RMC server 1606. In one instance, a network access device, such as a personal computer, can access the RMC Server 1606. In another instance, a computer system, such as a backend system 1608, can be linked to the RMC system 1606 either through a direct linkage 1640, such as a TI line, or via a network 1602. A protocol, such as the transmission control protocol internet protocol (TCP/IP) can be utilized to provide consistency and reliability.

Each network access device can include a processor, memory and a user input device, such as a keyboard and/or mouse, and a user output device, such as a display screen and/or printer. The network access devices 1610-1618 can communicate with RMC server 1606 to access data stored at RMC server 1606. Network access device 1610-1618 may interact with RMC server 1606 as if RMC server 1606 was a single entity in the network 1602. However, RMC server 1606 may include multiple processing and database subsystems, such as cooperative or redundant processing and/or database servers, that can be geographically dispersed throughout the network 1602. In some implementations, groups of network access devices 1610-1618 may communicate with RMC server 1606 through a local area network.

RMC server 1606 includes one or more databases 1604 storing data relating to carbon credit and offset risk management. RMC server 1606 may interact with and/or gather data from subscribers 1620, 1622, information source 1628, transaction personnel 1624, regulatory entity 1626, or other person in control of network access device 1610-1618. Data gathered from an operator may be structured according to risk criteria and utilized to calculate an RMC risk quotient 1536.

In one embodiment, information received at RMC server 1606 can be identified as to an information source from which it has been received. Identification can be accomplished, for example, with a data tag indicating the source. Identification of a source of information received can be useful in order to refer back to the information source for additional related information, or to store proprietary information which can only be released to designated subscribers 1620, 1622 or other designated entities, such as, for example, to comply with applicable privacy laws.

Typically, an operator or other user will access RMC server 1606 using client software executed at a network access device 1610-1618. The client software may include a generic hypertext markup language (HTML) browser, such as Netscape Navigator or Microsoft Internet Explorer, (a "Web browser"). The client software may also be a proprietary browser, and/or other host access software. In some cases, an executable program, such as a Java™ program, may be downloaded from RMC server 1606 to back end system 1608 and executed at network access devices 1610-1618 or back end system 1608 as part of the RMC system software. Other implementations include proprietary software installed from a computer readable medium, such as a CD ROM. The RMC system may therefore be implemented in digital electronic circuitry, computer hardware, firmware, software, or in combinations of the above. Apparatus of the RMC system may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 17:
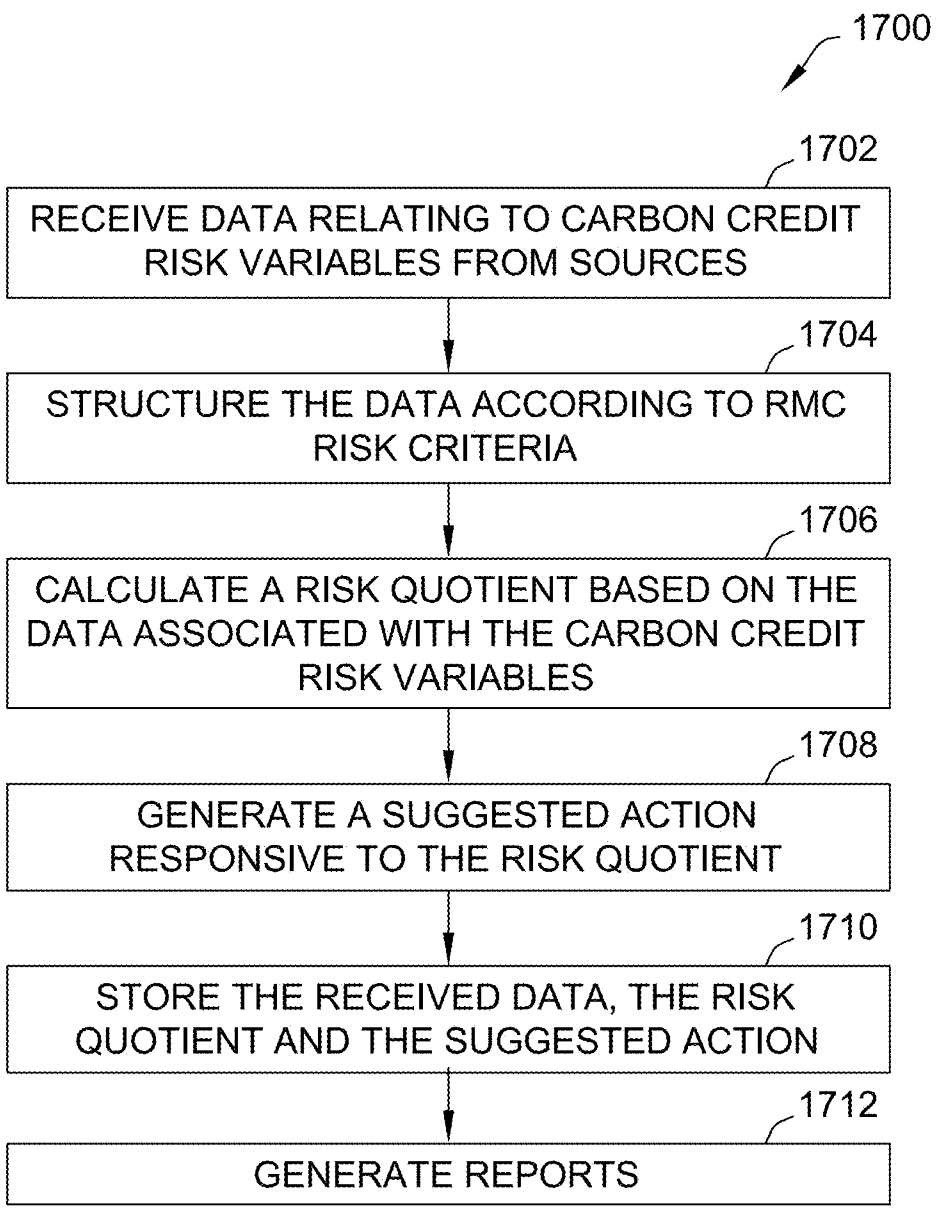
FIG. 17 is a flow diagram for managing risk associated with a carbon credit, according to an embodiment.

Referring now to FIG. 17, a flow diagram of a process 1700 to manage risk associated with a carbon credit certificate is shown. Process 1700 may be performed by an RMC system, such as RMC system 1702 shown in FIG. 15. At 1702, data relating to risk variables associated with the carbon credit is received from sources. Informational data can be gathered from a subscriber or a source of electronic data such as an investigation firm, external database, messaging system, news feed, government agency, or other data provider. Data can be received on an ongoing basis such that if new events occur in the world which affect the risk exposure of a carbon credit, an estimated risk value can be adjusted accordingly.

In addition to the types and sources of information listed previously that can provide indications of high risk, the financial institution or compliance entity can receive information that relates to requests to involve a financial institution that is not accustomed to foreign account activity; requests for secrecy or exceptions to Bank Secrecy Act requirements, routing through a secrecy jurisdiction, or missing wire transfer information; unusual and unexplained fund or transaction activity, such as fund flow through several jurisdictions or financial institutions, use of a government-owned bank, excessive funds or wire transfers, rapid increase or decrease of funds or asset value not attributable to the market value of investments, high value deposits or withdrawals, wires of the same amount of funds into and out of the account, and frequent zeroing of account balance; and large currency or bearer transactions, or structuring of transactions below reporting thresholds. Other information can include activities a transactor is involved in, associates of the transactor, governmental changes, attempting to open more than one account in the same time proximity, or other related events.

Sources of data can include, for example, publications issued by Treasury's Financial Crimes Enforcement Network ("FinCEN"), the State Department, the CIA, the General Accounting Office, Congress, the Financial Action Task Force ("FATF"), various international financial institutions (such as the World Bank and the International Monetary Fund), the United Nations, other government and non-government organizations, internet websites, news feeds, commercial databases, or other information sources.

In an embodiment, the RMC system receives an indication of whether the source of data wants the information tagged as originating from that source. Tagging can be useful for identifying which subscribers are free to receive which pieces of information and can also be useful to allow a subscriber to contact the source for further details related to the information. Tagging information with a source identifier can be a default or done only on request and accomplished with a simple identifier associated with a module or record of information.

At 1704, the RMC server (e.g., RMC server 1606 shown in FIG. 16) structures the data received according to defined RMC criteria. For example, information received can be associated with criteria including a position held by the account holder, the country in which the position is held, how long the position has been held, the strength of the position, the veracity of previous dealings with persons from that country, the propensity of people in similar positions to execute unlawful or unethical transactions, the type of account or other criteria. In one embodiment, data is linked according to relations with other data in a database.

Alternatively, the RMC server may receive the data in a pre-structured format. Receiving the data in a pre-structured format allows the RMC system to proceed with calculating a risk quotient without having to further structure the information. Information that cannot be easily structured can also be received and archived in order to facilitate a manual qualitative evaluation.

Types of accounts to be opened may include, for example: an individual account, a public company domiciled in a G-7 country or Hong Kong, a public company not domiciled in a G-7 country or Hong Kong, a corporate account regulated by a G-7 agency or a corporate account regulated by a non G-7 government agency, a private company or partnership, a holding company, an intermediary managed account such as a money manager or hedge fund, a trust or foundation, or other type of legal entity.

At 1706, a risk quotient can be calculated by weighting the data received according to its importance in determining the likelihood of illegal or unethical dealings. Calculating a risk quotient can be accomplished by assigning a numerical value to each field of information, wherein the numerical value is representative of the risk associated with a particular piece of data. For example, it may be determined in one case that a corporation that is third-party verified, transparent, and committed to rigorous standards of social and environmental performance poses minimal risk. Therefore, this information from the first case is assigned a low numerical value, or even a negative numerical value. In a second case, a large corporation having a record of selling "phantom credits" that do not represent genuine carbon reductions poses a high risk and is assigned a high numerical value. In addition, a weight can be assigned to an RMC risk category (e.g., third-party verified) to which the data is assigned. A risk quotient can be calculated by multiplying a weighted numerical value of the specific information times the category weighting.

For example, information received may indicate a transactor is a high-ranking finance official from a G7 country. The ownership structure of a company the transactor wishes to transact is a certified B corporation. A certified B corporation may receive a numerical value of −5 because it is a relatively low risk business model. In addition, this information may be included in a Company Profile category, wherein the Company Profile is assigned a category weighting of 3. Therefore, the net score for this ownership structure is −5 times 3 or −15. Similarly, the transactor or associated account holder being a high ranking official from a G-7 country may also receive a low number such as 1. The RMC risk quotient for the transactor would be 1 times 3, or 3. All scores within the Company Profile can be summed to calculate an RMC risk quotient. In this case the RMC risk quotient is −15+3 which equals −12, indicating a low risk. Weighted risk scores from all associated categories can be summed to calculate a total Risk Quotient Score 108.

At 1708, a suggested action may be generated that is responsive to the Risk Quotient. For example, in response to a high risk score a suggested action may be to not proceed with a transaction involving the carbon credit, or even to notify an authority. In response to a low risk score, the RMC system may respond by completing transactions as usual. Intermediate scores may respond by suggesting that additional information be gathered, that transactions for this account be monitored, or other interim measures.

The RMC system can also store, or otherwise archive RMC data and proceedings. For example, the RMC system can store the received data, the generated risk quotient, and the suggested action(s) to be taken. This information can be useful to quantify corporate governance and diligent efforts to address high risk situations. Accordingly, reports quantifying risk management procedures, executed due diligence, corporate governance or other matters can be generated at 1712.

Figure 18:
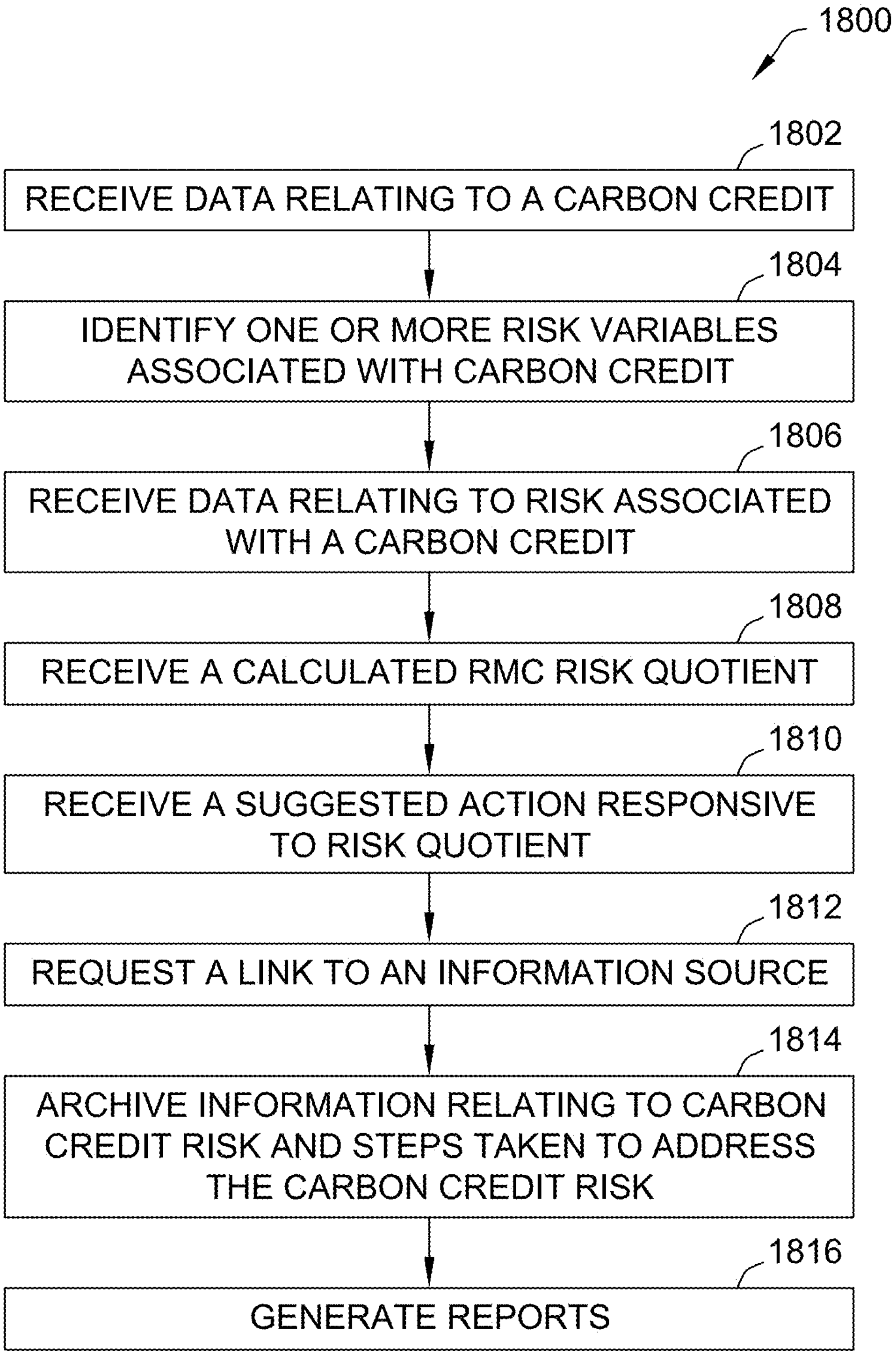
FIG. 18 is a flow diagram for managing risk associated with a carbon credit, according to an embodiment.

Referring now to FIG. 18, a flow diagram 1800 illustrating a process that a subscriber or other user, such as a financial institution, can implement to manage risk associated with a transaction is shown. At 1802, the subscriber receives data relating to carbon credit. This data may be received during the normal course of business, such as when the participants to a transaction are ascertained. In one embodiment, software can scan a user's computer(s) responsible for transactions and glean pertinent information from the transactions taking place and transmit the information to the RMC system.

At 1804, one or more entities, jurisdictions, or other risk variables associated with the carbon credit are identified. Access can be accomplished by opening a dialogue with an RMC system. Typically, the dialogue would be opened by presenting a GUI to a network access device accessible by a person or an electronic feed that will enter information relating to the transactor. The GUI is capable of accepting data input via a network access device. An example of a GUI would include a series of questions relating to a transaction. Alternatively, information can be received directly into fields of a database, such as from a commercial data source.

In some embodiments, automated monitoring software can run in the background of a normal transaction program and screen data traversing an application. The screened data can be processed to determine key words wherein the key words can in turn be transmitted to the RMC system as risk variables. The RMC System can process the key words to associate entities, jurisdictions, or other data with risk variables. Monitoring software can also be installed to screen data traversing a network or communications link.

At 1806, a user can receive risk variable associated data relating to risk that may be associated with a transaction associated with a carbon credit. The received data can include, for example: artifacts, a copy of related news articles, documents or any other risk variable related data. At 1808, the user receives a risk quotient indicating an amount of risk associated with completing a transaction involving a carbon credit.

At 1810, the user receives a suggested action. The suggested action may be generated responsive to the calculated RMC risk quotient. For example, in response to a high risk score a suggested action may be to not proceed with a transaction, or even to notify an authority. In response to a low risk score, the financial institution may respond by completing transactions as usual. Intermediate scores may respond by suggesting that additional information be gathered, that transactions for this account be monitored, or other interim measures.

At 1812, if the user would like to follow up by receiving more information or additional details regarding the received data, the user can request a link from the RMC system to an information source for particular information. For example, if the RMC system has information in the data structure indicating that a company may have particular traits that indicate high risk, the user may wish to obtain additional information descriptive of that company. The RMC system may have tagged the information when it was received with an identifier of the data source, for example an investigation firm. The user can request contact information to the investigation firm, which is the source.

At 1814, the user can archive information relating to risk associated with a transaction as well as steps taken to address the risk. The process involved in utilizing the RMC system can be included in the archive as steps taken to diligently manage risk associated with a transaction. In addition, reports can be generated to quantify the archived information and otherwise document diligent actions taken relating to risk management at 1816.

Figure 19:
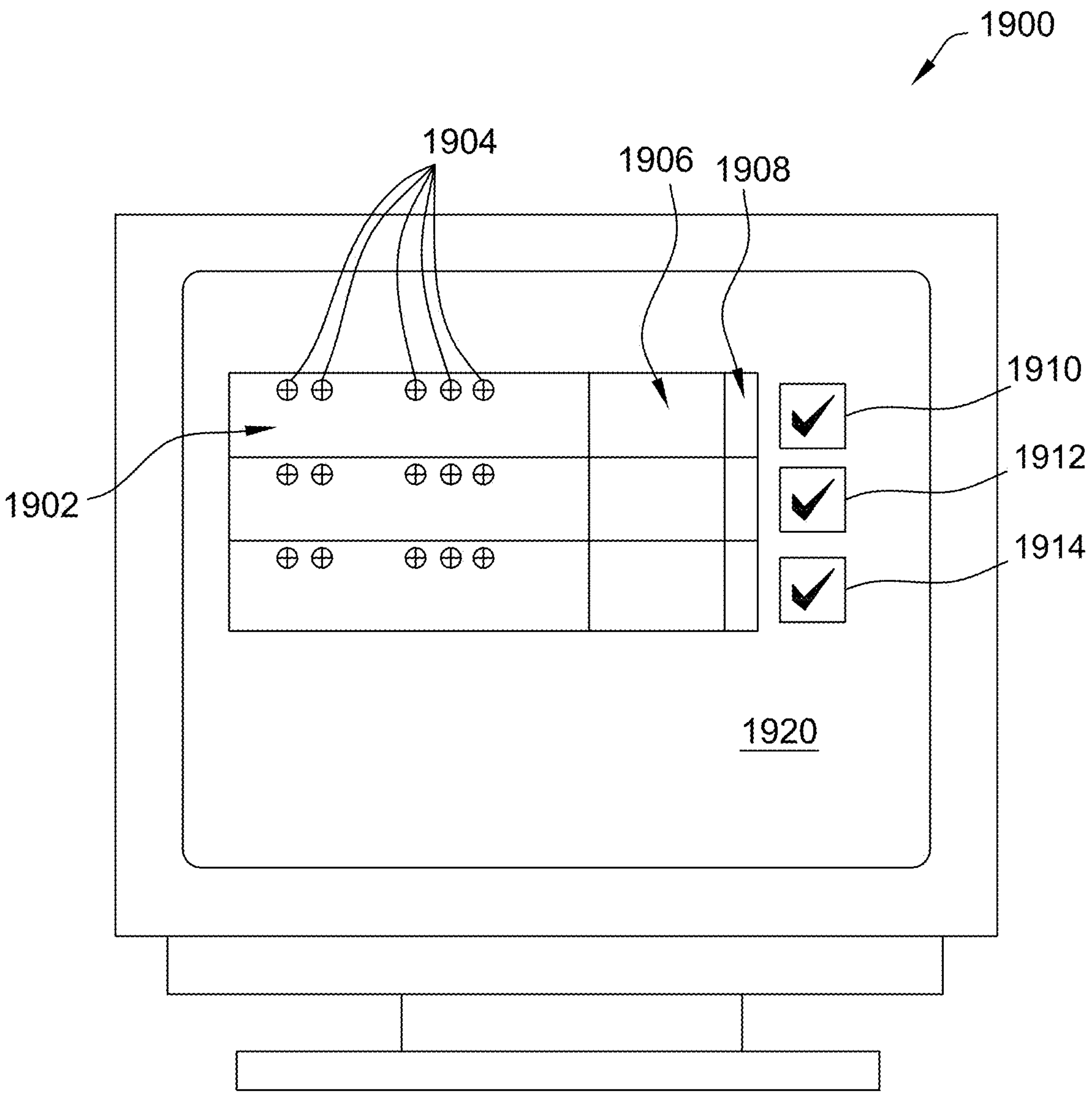
FIG. 19 is a schematic diagram of a graphical user interface (GUI) for displaying information related to RMC, according to an embodiment.

Referring now to FIG. 19, an exemplary GUI 1900 for displaying information related to RMC is shown. GUI 1900 can include areas prompting for information, such as in the form of a key word or a question 1902. Areas can also be included for an appropriate response 1906. The area for an appropriate response 1906 can, for example, receive text, allow a selection from choices proffered, or otherwise receive data into the RMC server. A programmable user interactive device, such as a checkbox, X field, yes/no filed or other device 1910, 1912, 1914, can also be utilized to indicate an answer, or otherwise input information. Other programmable devices, such as programmable icons, hyperlinks, push buttons or other devices 1904 can also be utilized to execute a particular function. A category weighting area 1908 can also be indicated on GUI 1900. Typically, the weighting will be predetermined. However, if desired the weighting can be modified by a user such that a weighting value, such as a numerical value, will be utilized to calculate a risk quotient. GUI 1900 can also include an area for displaying a quotient score relating to a carbon credit 1920.

Figure 20:
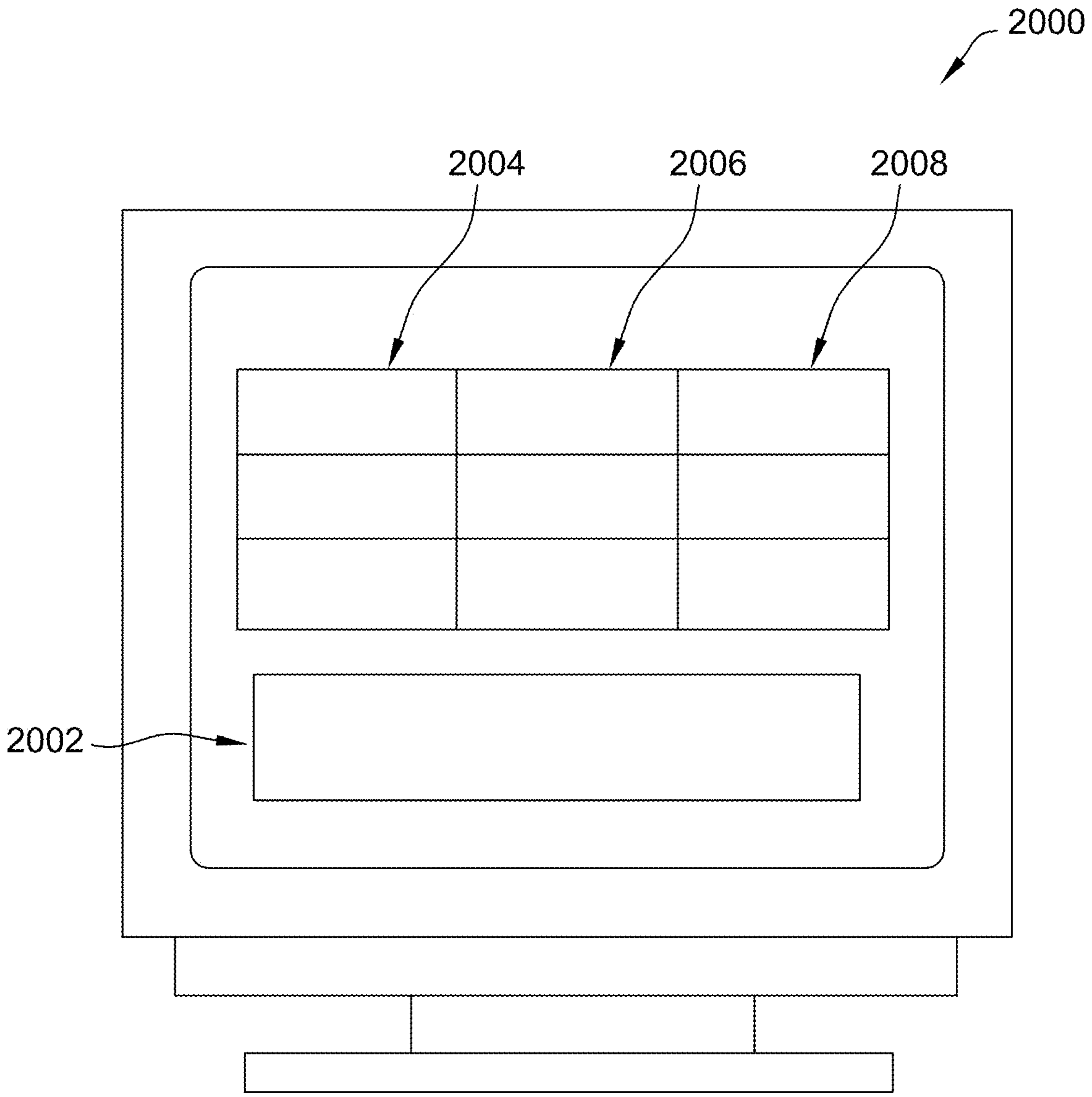
FIG. 20 is a schematic diagram of a GUI for presenting reports or suggested actions related to RMC, according to an embodiment.

Referring now to FIG. 20, an exemplary GUI 2000 for presenting reports or suggested actions related to RMC is illustrated. GUI 2000 for presenting reports can include geographic areas of a user interface containing risk management procedures 2002, including those procedures specifically followed in relation to a particular RMC or other suggested actions. Additional areas can include a list of electronic or hardcopy reports available concerning risk management efforts undertaken 2004. Another area can include a list of risk quotients and/or calculations concerning a risk quotient, such as the average risk quotient for the financial institution, or the mean risk quotient 2006. Still another area can contain information descriptive of a particular transactor or RMC 2008.

Machine Learning Carbon Credit Models

As noted above, CCM computing device 1102 (shown in FIG. 11) may determine various scores for a carbon credit pricing algorithm via a carbon credit pricing algorithm, a credit carbon risk algorithm, and/or other algorithms used to calculate the price, quality, etc. of one or more carbon credits. In an embodiment, one or more of the described algorithms may be used to create one or more models. Carbon credit information may be received from general economic data sources, technological data sources, government data sources, proprietary data sources, subscribers, and/or other sources and fed into one or more models which determine risk profiles, quantifications (e.g., price), and/or risk ratings. For example, the carbon credit pricing algorithm and/or the carbon credit risk algorithm may be used to generate a credit carbon risk model. In an embodiment the credit carbon risk model is a machine learning (ML) (e.g., artificial intelligence or "AI") model. In a further embodiment, the credit carbon risk model is a trained model which uses a training dataset to train the credit carbon risk model, and the trained credit carbon risk model may be used for processing subsequent data inputs. The credit carbon risk model may be used to generate a risk assessment, such as a risk quotient or similar rating related to risk, quality, pricing, etc., a suggested action, and/or reports, such as due diligence reports. The training dataset for the credit carbon risk model may include historical risk assessments, suggested actions, and reports generated for a carbon credit, and risk data associated with that carbon credit. CCM computing device 1102 may train an untrained credit carbon risk model with such training data to generate accurate risk assessments, rational suggested actions, and detailed due diligence reports. The credit carbon risk model may base the suggested actions on the risk assessment. For example, if the credit carbon risk model generates a risk quotient for a carbon credit associated with very high risk, the suggested action may be to discontinue the transaction associated with the carbon credit, notify authorities, or other appropriate actions. When new carbon credit data is generated (e.g., when a new risk quotient is calculated for a carbon credit), the new carbon credit data may be added to the training dataset to generate an updated training dataset. Subsequently, CCM computing device 1102 may re-train the credit carbon risk model using the updated training dataset, further improving the accuracy of the identity insights model.

As used herein, "ML model" refers to any mathematical model, statistical model, decision-making model, algorithm, or function that includes machine learning functionality. A ML model may be trained or untrained. As used herein, "trained model" or "trained ML model" refers to any ML model that has been trained through the processing of training data. As used herein, "untrained model" or "untrained ML model" refers to any ML model that has not been trained through the processing of training data.

Exemplary Blockchain System for Carbon Credit Data

As used herein, a blockchain is a distributed database that maintains a continuously-growing list of ordered records, known as blocks. Each block may contain at least a timestamp and a link to the previous block in the chain. The link to the previous block may be a hash of the previous block. For a carbon credit, the first block may contain the initial risk quotient calculated for the carbon credit. The second block may contain an updated risk quotient calculated for the carbon credit at a later time. The second block may contain a hashed copy of the first block as well. This continues on with each block adding on to the next while containing a hash of the previous blocks in the blockchain.

To ensure the security of the information contained in the blockchain, copies of the blockchain may be distributed across multiple computer devices, known as nodes. These nodes maintain the blockchain, update the blockchain when changes occur, and ensure the stability of the blockchain itself. In some embodiments, nodes may be also used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining.

The system described herein may include one or more blockchain node computing devices of a blockchain network, wherein the blockchain network provides an encrypted, distributed, and immutable ledger in which risk and other data associated with one or more carbon credits are stored. Therefore, the disclosed system may help protect the integrity of the carbon trading markets by providing a secure way to track the quality, risk, and pricing of carbon credits, which in turn will help combat climate change. In some embodiments, each blockchain node computing device may store a local, complete copy of the ledger as a plurality of blockchains. In other embodiments, a blockchain node may store one or more blockchains of the plurality of blockchains. A blockchain is a distributed database that maintains a continuously-growing list of ordered records, known as blocks. Each blockchain may include a sequence of blocks, wherein each block is cryptographically verifiable and enforces a chronological order of data stored in the subsequent blocks.

Figure 21:
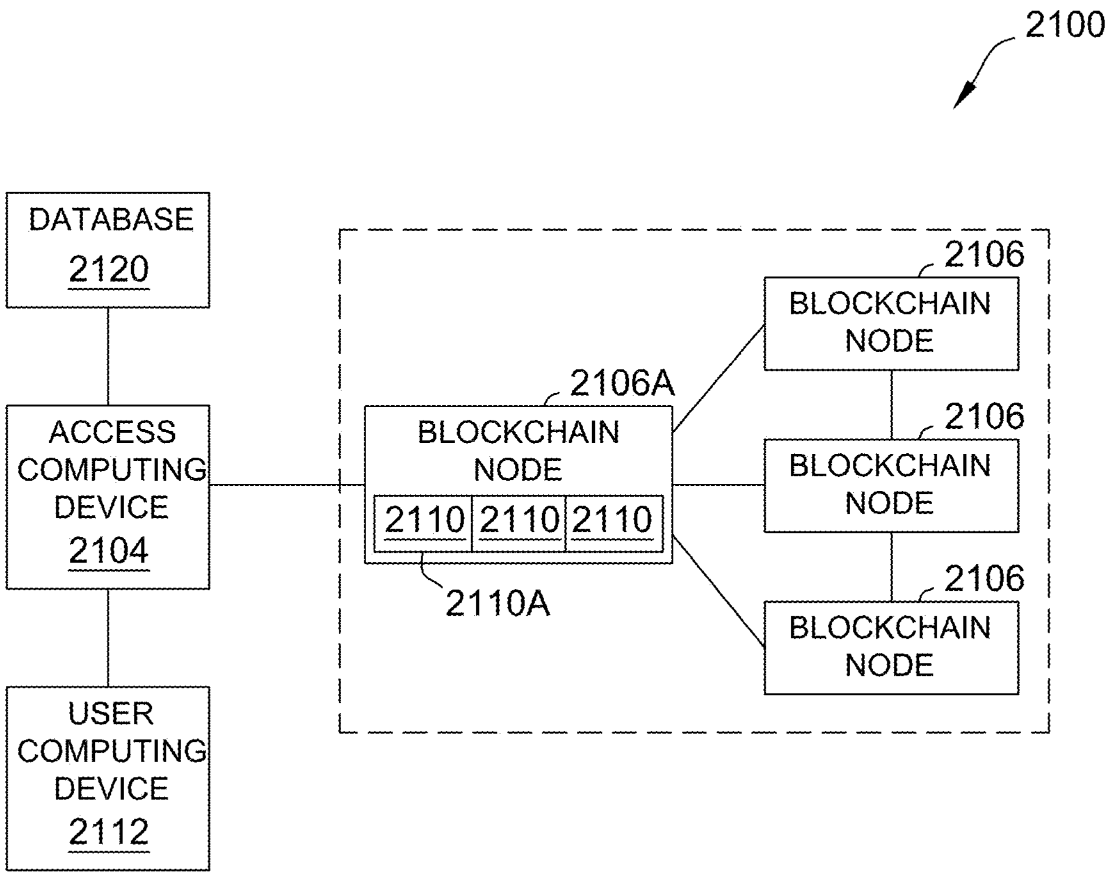
FIG. 21 is a block diagram of a computing environment, according to an embodiment.

FIG. 21 depicts an exemplary computing environment 2100 for creating a blockchain that securely and accurately stores and manages risk management information relating to carbon credits. A carbon credit computer system 2102 may be used to create a blockchain that for storing and managing risk information associated with a carbon credit. This enables the risk information associated with carbon credits to be easily retrieved and viewed by multiple parties. In some embodiments, computer system 2102 includes an access computing device 2104 and at least one blockchain node computing device 2106 (also referred to herein as "nodes" 2106) of a blockchain network 2102. Access computing device 2104 is communicatively coupled, such as via wireless communication or data transmission over one or more radio frequency links or digital communication channels, or wired communication, or via an Application Programming Interface (API), to at least one node 2106A, and node 2106A is communicatively coupled to a plurality of other nodes 2106B, such as via wireless communication or data transmission over one or more radio frequency links or digital communication channels, or wired communication. Access computing device 2104 may comprise a network access device 1610-1618 shown in FIG. 16.

The plurality of nodes 2106 may form blockchain network 2102. Each node 2106 may store a respective copy of a plurality of blockchains 2110. As described further herein, each blockchain 2110 may include a sequence of one or more blocks that are cryptographically verifiable and enforce a chronological order of data stored in subsequent blocks, and each block after a first block may include a description of data stored in a previous block and/or a link to the previous block.

As described in more detail, access computing device 2104 may be configured to access and update risk data associated with one or more carbon credits by (i) accessing a blockchain network through a first blockchain node computing device, the blockchain network including a plurality of node computing devices that store a respective copy of a plurality of blockchains, each blockchain including a sequence of one or more blocks that are cryptographically verifiable and enforce a chronological order of data stored in subsequent blocks, wherein each block after a first block includes a description of data stored in a previous block; (ii) receiving a request for information from a first blockchain of the plurality of blockchains, the request including an asset identifier associated with a carbon credit; (iii) transmitting a query including the asset identifier to the first blockchain node computing device, the asset identifier identifying the first blockchain and causing the first blockchain node computing device to identify a last block in the first blockchain, the last block including an encryption of information associated with the carbon credit; (iv) receiving the encryption of the information associated with the carbon credit from the first blockchain node computing device; (v) accessing a public key to decrypt the encryption of the information associated with the carbon credit; (vi) transmitting updated risk data based at least in part upon the decrypted risk; (vii) receiving an acceptance notification indicating acceptance of the updated risk data; and (viii) in response to said receiving the acceptance notification, automatically transmitting an update instruction to the first blockchain node computing device, the update instruction including the updated risk data, the update instruction causing the first blockchain node computing device to generate and store a new block subsequent to the last block, the new block including an encryption of the updated risk data and a description of data stored in the last block.

A user may interact with access computing device 2104 (e.g., directly or indirectly) to view and manage carbon credit information, such as one or more risk variables and/or one or more risk quotients. For instance, the user may interact with a website, software application ("app") or other such platforms to view risk data associated with a carbon credit certificate (e.g., a risk quotient) and a history of data associated with a carbon credit certificate (e.g., past risk quotients calculated for the carbon credit), and to update the risk data associated with the carbon credit. In some embodiments, access computing device 2104 may be associated with an organization, such that a user may interact with access computing device 104 at a location associated with the organization (e.g., at an office location associated with the organization). Alternatively, access computing device 104 may be associated with a user, such that the user may interact with access computing device 104 substantially any time and/or in any location.

As noted above, Access computing device 2104 may comprise a network access device 1610-1618 shown in FIG. 16. Additionally, or alternatively, a user may use a user computing device (e.g., client computing device 1202 shown in FIG. 12) to remotely or indirectly interact with access computing device 2104. For instance, user may use user computing device 1200 to interact with a carbon credit program dashboard on an app or a website, and client computing device 1202 may be configured to transmit any input information or requests to access computing device 2104 as described herein.

Access computing device 2104 and/or user computing device 1200 may be computers that include a web browser or a software application, which enables access computing device 2104 and/or user computing device 1200 to access remote computer devices, such as node 2106A, using the Internet or other network. More specifically, access computing device 2104 and/or user computing device 1200 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Access computing device 2104 and/or user computing device 1200 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

In addition, nodes 2106 may be computers configured to communicate with one another, using the Internet or other network. More specifically, nodes 2106 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. In some embodiments, nodes 2106 may be any device capable of accessing the Internet including, but not limited to, a desktop computer, a laptop computer, a personal digital assistant (PDA), a cellular phone, a smartphone, a tablet, a phablet, wearable electronics, smart watch, voice or chat bot, ChatGPT bot, augmented reality or virtual reality headsets or glasses, or other web-based connectable equipment or mobile devices. In other embodiments, nodes 2106 may be server computing devices specifically configured to function as blockchain nodes 2106.

In some embodiments, access computing device 2104 may function as node 2106. Accordingly, where reference is made herein to access computing device 2104 accessing and/or otherwise communicating with nodes 2106 (e.g., with node 2106A), it should be understood that such reference may equally refer to access computing device 2104 accessing node functionality within access computing device 2104 itself.

Access computer device 2104 may be further communicatively coupled to a database 2120 that stores data. For instance, database 2120 may be a local or remote database 2120 associated with carbon credits and configured to store data not stored in blockchain network 2102 and/or store a local copy of certain data stored in blockchain network 2102. In some embodiments, database 2120 may store one or more smart contracts. In some embodiments, database 2120 may store one or more of user data, transaction data, asset data, smart contracts, and/or any other suitable information. In some embodiments, database 2120 may be stored remotely from access computing device 2104. In some embodiments, database 2120 may be decentralized. In some embodiments, a subscriber may access database 2120 via access computing device 2104 and/or another computing device (not shown) associated with the organization.

In an embodiment of the present disclosure, a carbon credit computer system (e.g., computer system 2100) for managing carbon credit data using blockchains may include a first blockchain node computing device (e.g., node 2106A) integral to a blockchain network (e.g., blockchain network 2102). The blockchain network may include a plurality of blockchain node computing devices (e.g., nodes 2106) including the first blockchain node computing device. The first blockchain node computing device may be configured to store a local copy of a plurality of blockchains (e.g., blockchains 2110), each blockchain including a sequence of one or more blocks, wherein each block is cryptographically verifiable and enforces a chronological order of data stored in subsequent blocks. Each block after a first block may include a description of data stored in a previous block.

Exemplary Blockchain

Figure 22:
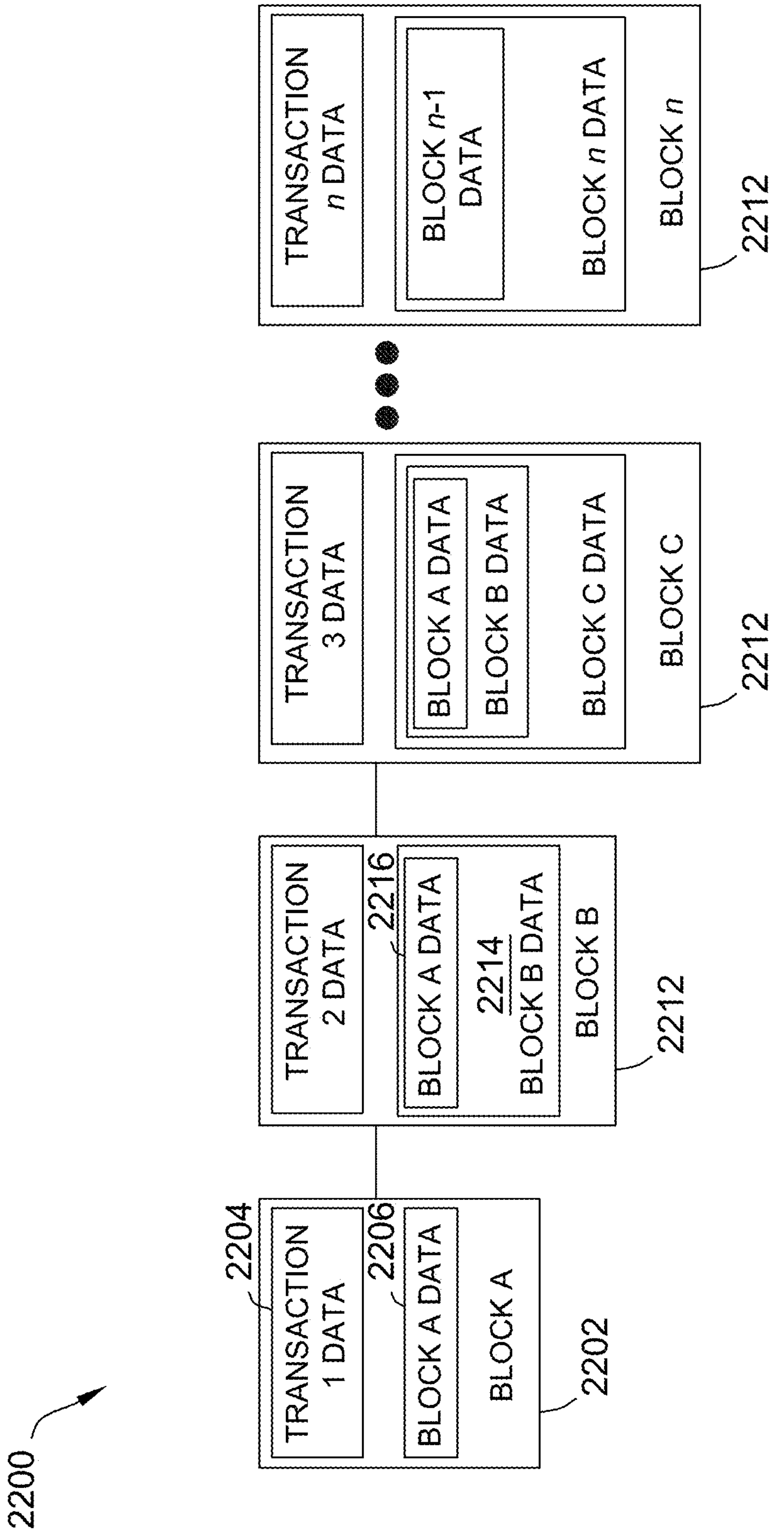
FIG. 22 is a block diagram of a blockchain, according to an embodiment.

FIG. 22 depicts an exemplary blockchain 2110 that may be generated and stored using one or more blockchain nodes 2106 of a blockchain network (all shown in FIG. 21). Blockchain network may be a distributed database that maintains a continuously growing blockchain 2110, or list, of ordered records, known as blocks 2202. Blockchain network may provide an encrypted, distributed, and immutable ledger as blockchains 2110 in which transaction information is stored. Each blockchain 2110 includes a sequence of one or more blocks 2202 that are cryptographically verifiable and enforce a chronological order of data stored in subsequent blocks 2202.

In one exemplary embodiment, the one or more blocks 2202 may include a first block 2202 (referred to as "Block A" in FIG. 22) which may store carbon credit data 2204. Carbon credit data 2203 may include, but is not limited to one or more risk quotients, one or more risk variables, a description of the carbon credit, transactions associated with the carbon credit, and/or any other information associated with the carbon credit. Block A may further include Block A data 2206 associated specifically with Block A. For instance, Block A data 2206 may include a timestamp associated with the generation of Block A and/or an identifier of a node 2106 at which Block A was generated.

The one or more blocks 2202 may additionally include subsequent blocks 2212 (referred to individually as "Block B," "Block C," through "Block n" in FIG. 22 and collectively as blocks 2212). Each subsequent block 2212 may include carbon credit data 2204 and block data 2206, any of which may be similar to or different from the data stored in Block A. For instance, each subsequent block 2212 may include a subsequently calculated risk quotient. In an embodiment, each block 2202, 2212 contains one risk quotient, each block 2202, 2212 may consist of any number of risk quotients. Additionally, or alternatively, each block 202, 212 may include risk quotients from a particular time interval (e.g., all new blockchain transactions are grouped into a block every month). In some embodiments, each risk quotient is associated with a unique identifier that is stored on the respective block.

Each subsequent block 2212 may also include block data 2214 associated with that corresponding block 2212. For subsequent blocks 2212, block data 2214 may not only include data associated specifically with that block 2212 (e.g., timestamp, node 2106 identifier) but may further include a description of the previous block 2212's data. As one specific example, Block B data 2214 may include a description 2216 of Block A, wherein description 2216 may include a hash of Block A. The hash may be generated by executing a hashing function on the data 2204, 2206, 2208, 2210 stored in Block A. This continues on, with each block 2212 adding on to the next while containing a hash of the previous block(s) 2212 in blockchain 2110. In this way, the chronological series of data stored in a single blockchain 2110 may be verifiable and immutable.

Exemplary System for Blockchain Mining

Figure 23:
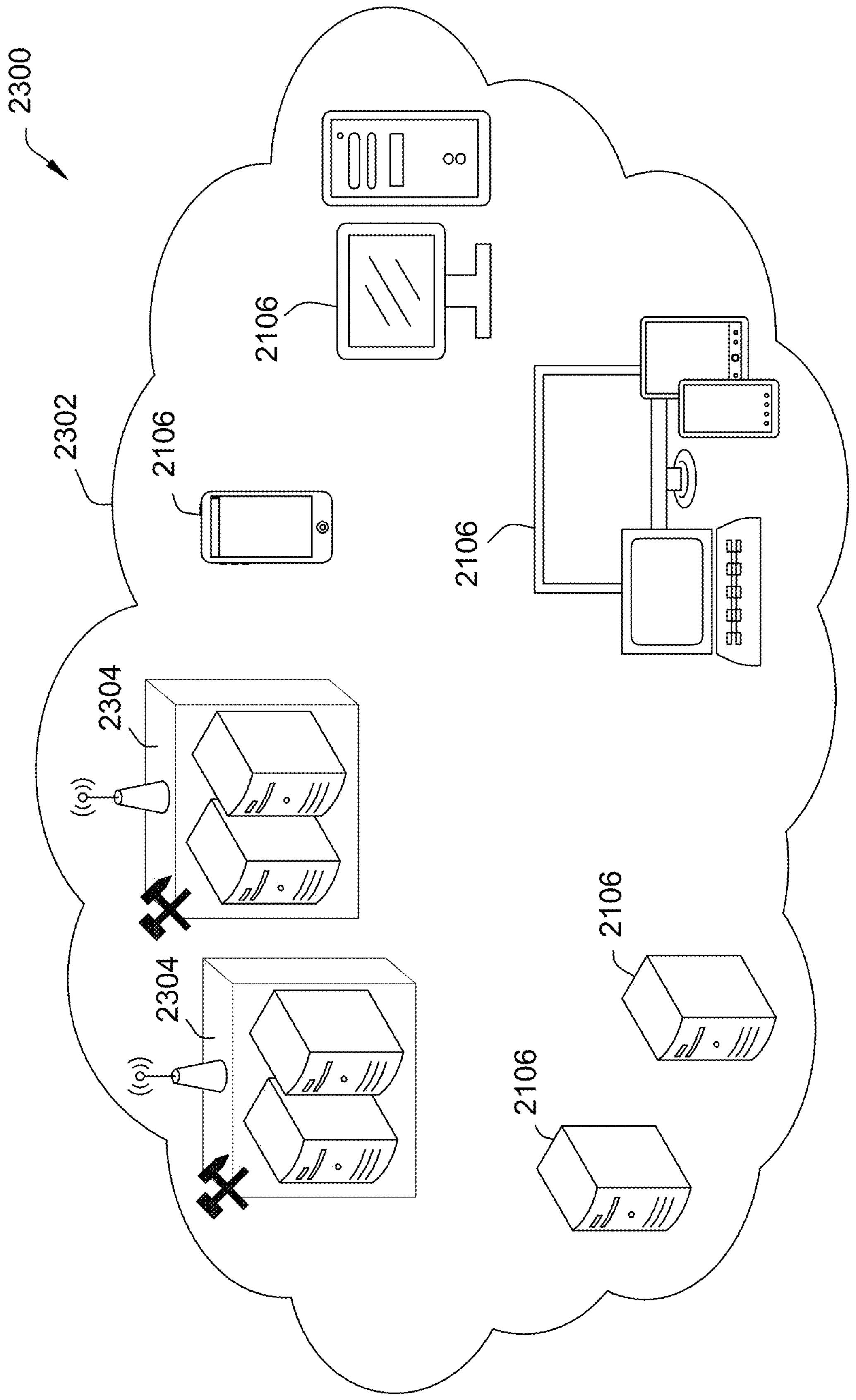
FIG. 23 is a block diagram of a blockchain mining system, according to an embodiment.

FIG. 23 illustrates a block diagram 2300 of an exemplary blockchain mining system 2302 in accordance with one embodiment of the present disclosure. Blockchain mining system 2302 may be integral to and/or otherwise associated with a blockchain network (e.g., blockchain network 2102 shown in FIG. 21). Blockchain mining system 2302 may include a supernode 2304 and a plurality of nodes 2106 (shown in FIG. 21). Some nodes 2106 may just be storing the latest copy of a blockchain 2110 (shown in FIG. 21). Other nodes 2106 may be miners and are processing blocks 2202 (shown in FIG. 22) in blockchain 2110.

Supernode 2304 monitors blockchain 2110 and the integrity of system 2302. For example, supernode 2304 may monitor when different nodes 2106 go offline or become unavailable. Supernode 2304 may also add nodes 2106 to system 2302 and ensure that nodes 2106 have up-to-date copies of blockchain 2110. System 2302 may include a plurality of nodes 2106 from a plurality of sources to improve or increase the size and the integrity of each blockchain 2110.

In some embodiments, nodes 2106 may include one or more access computing device(s) 2104 (shown in FIG. 21) and/or one or more client computing devices 1202 (shown in FIG. 12). Nodes 2106 may additionally or alternatively include other computer devices of an organization. Nodes 2106 may also include computer devices, such as servers, workstations, and mobile devices of a blockchain federation or network (e.g., blockchain network) that may extend outside of the control of the organization. In some embodiments, the organization maintains one or more blockchains 2110, where each blockchain 2110 contains data associated with carbon credits.

When new data is validated at nodes of a blockchain network, the nodes may wirelessly stream the data to be added to the corresponding blockchain 2110. This data may be added to the appropriate blocks 2202.

The data may be passed to the various other nodes 2106 in system 2302, where the data will be stored in blockchains 2110 in each of the various nodes 2106 storing the blockchain 2110. In some embodiments, the data may be transferred and each node 2106 generates the next block in the blockchain 2110. In other embodiments, the originating node 2106 may generate the next block and transmit the block to the other nodes 2106. In still other embodiments, supernode 2304 may generate the next block and transmit the block to the nodes 2106.

Exemplary Computer-Implemented Process for Managing Carbon Credit Information

Figure 24:
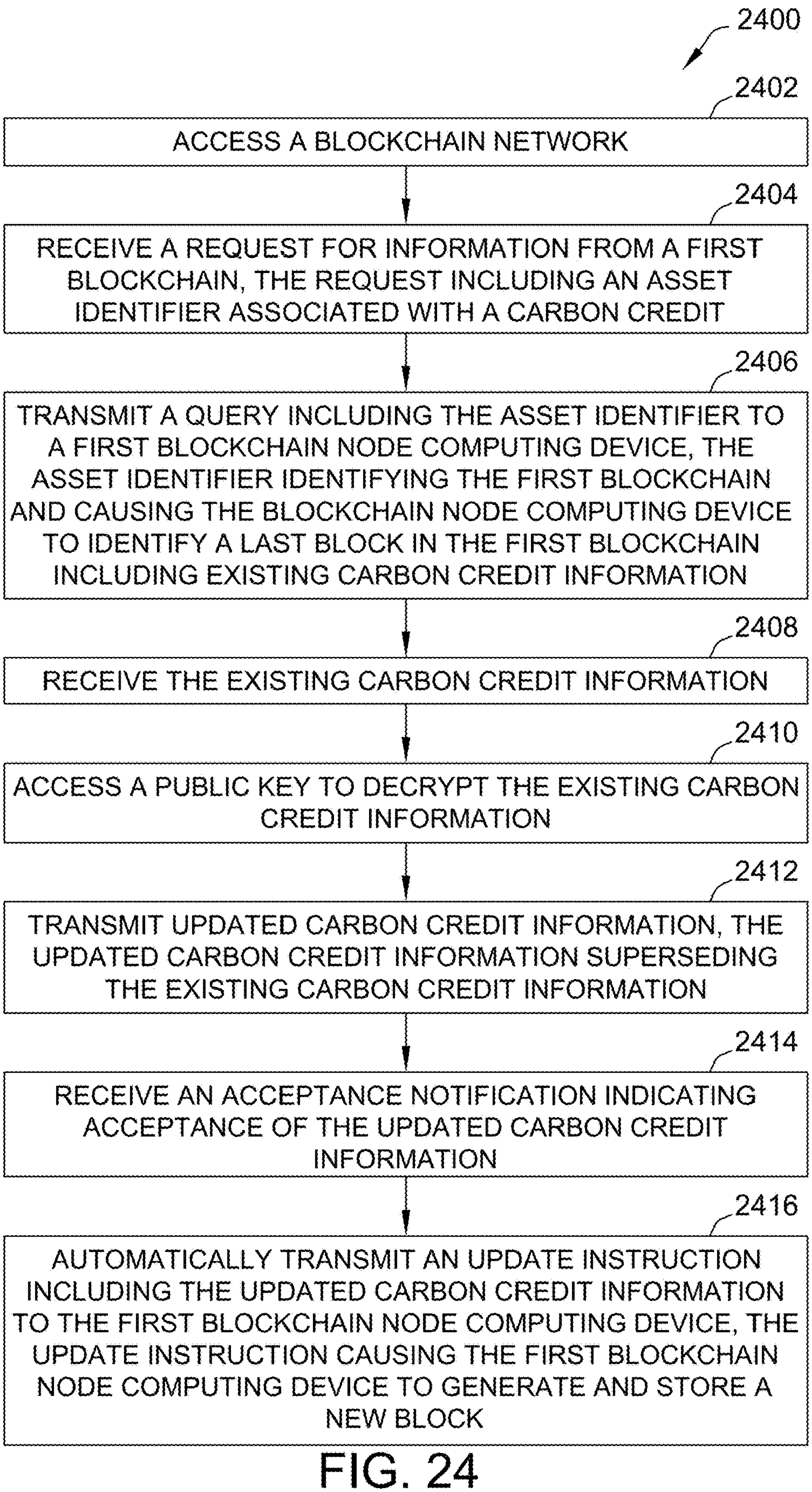
FIG. 24 is a flow diagram of a computer-implemented process for creating a blockchain that securely and accurately stores carbon credit information, according to an embodiment.

FIG. 24 illustrates a flow diagram of an exemplary computer-implemented process 2400 for one aspect of creating a blockchain that securely and accurately storing carbon credit information using carbon credit computer system 2102 (shown in FIG. 21). One or more steps of process 2400 may be implemented using access computing device 2104 (also shown in FIG. 1). Additionally, or alternatively, one or more steps of process 2400 may be implemented using one or more nodes 2106 and/or user computing device 2112 (both also shown in FIG. 21).

In the exemplary embodiment, process 2400 may include accessing 2402 a blockchain network through a first blockchain node computing device. The blockchain network may include a plurality of node computing devices that store a respective copy of a plurality of blockchains, each blockchain including a sequence of one or more blocks that are cryptographically verifiable and enforce a chronological order of data stored in subsequent blocks, wherein each block after a first block includes a description of data stored in a previous block. Process 2400 may also include receiving 2404 a request for information from a first blockchain of the plurality of blockchains, the request including an asset identifier associated with a carbon credit. Process 2400 may further include transmitting 2406 a query including the asset identifier to the first blockchain node computing device, the asset identifier identifying the first blockchain and causing the blockchain node computing device to identify a last block in the first blockchain, the last block including an encryption of existing information relating to the carbon credit (e.g., a risk quotient).

In addition, process 2400 may include receiving 2408 the encryption of the existing information from the first blockchain node computing device and accessing 2410 a public key to decrypt the encryption of the carbon credit information. Process 2400 may further include transmitting 2412 updated carbon credit information (e.g., an updated risk quotient), the updated carbon credit information superseding the existing carbon credit information, and receiving 2414 an acceptance notification indicating acceptance of the updated carbon credit information. Process 2400 may still further include, in response to receiving 2414, automatically transmitting 2416 an update instruction to the first blockchain node computing device, the update instruction including the updated carbon credit information, the update instruction causing the first blockchain node computing device to generate and store a new block subsequent to the last block, the new block including an encryption of the updated carbon credit information and a description of data stored in the last block. Process 2400 may include additional, fewer, and/or alternative steps to those illustrated in FIG. 24.

Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally, or alternatively, the machine learning programs may be trained by inputting sample data sets or certain data into the programs, such as images, object statistics and information, audio and/or video records, text, and/or actual true or false values. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

As described above, the systems and methods described herein may use machine learning, for example, for pattern recognition. That is, machine learning algorithms may be used by computing device 1102, for example, to identify patterns in internal index data and external index data for the pricing of carbon credits and the pricing of carbon credit certificates based on the pricing of the carbon credits. Accordingly, the systems and methods described herein may use machine learning algorithms for both pattern recognition and predictive modeling.

ADDITIONAL CONSIDERATIONS

Although the foregoing specification generally discusses the disclosed systems, devices, and methods as applied to bonds, the disclosed systems, devices, and methods may be applied to anything "ratable" or which can be evaluated on a comparable basis, including but not limited to, any type of security, financial interest, financial instrument, asset, or the like. As such, the disclosed systems, devices, and methods may be applied to various types of securities, financial interests, financial instruments, assets, etc., to increase transparency and consistency and deploy dynamic updating as things change, thereby reducing the opportunity for fraud, error, mispricing, and/or pricing dislocations.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A carbon credit marketplace (CCM) computing device comprising at least one processor in communication with a memory device, the at least one processor configured to:

receive a request for carbon credit information associated with a carbon credit certificate;

perform an analysis of the carbon credit certificate as a function of the request for the carbon credit information, wherein performing the analysis of the carbon credit certificate comprises:

transmitting a query to a first blockchain node computing device of a first blockchain, wherein the query causes the first blockchain node computing device to identify a last block in the first blockchain comprising existing carbon credit information;

retrieving the carbon credit information;

determining and assigning values to a plurality of attributes of the carbon credit certificate based on an analysis of the carbon credit information, wherein each carbon credit attribute is given a weighting relative to other attributes of the plurality of attributes;

determining, by a scoring algorithm using a neural network, a score for the carbon credit certificate, based on each carbon credit weighted attribute value, wherein the neural network is configured to adjust at least one weighted attribute value based on an ESG compliance regulation; and determining a carbon credit rating based on the score and a mapping of score ranges to carbon credit ratings; and transmit an update instruction to the first blockchain node computing device, the update instruction causing the first blockchain node computing device to generate and store a new block comprising an encryption of the determined carbon credit rating.

2. The CCM computing device of claim 1, wherein when the carbon credit certificate is issued by an entity, the plurality of attributes of the carbon credit certificate include carbon dioxide emission rights.

3. The CCM computing device of claim 1, wherein when the carbon credit certificate is issued by an entity, the plurality of attributes of the carbon credit certificate include at least one category selected from the following:

nature loss;

nature-based sequestration;

emission-reduction avoidance; and technology-based removal of carbon dioxide.

4. The CCM computing device of claim 1, further comprising:

receiving a weighting scheme as input for the plurality of attributes of the carbon credit certificate.

5. The CCM computing device of claim 1, further comprising:

receiving the plurality of attributes of the carbon credit certificate as input.

6. The CCM computing device of claim 1, wherein the scoring algorithm is configured to set a desired level of granularity.

7. The CCM computing device of claim 1, wherein the mapping of score ranges to carbon credit ratings is configurable.

8. A computer-implemented method for dynamically generating carbon credit ratings, comprising:

receiving a request for carbon credit information associated with a carbon credit certificate;

performing an analysis of the carbon credit certificate as a function of the request for the carbon credit information, wherein performing the analysis of the carbon credit certificate comprises:

transmitting a query to a first blockchain node computing device of a first blockchain, wherein the query causes the first blockchain node computing device to identify a last block in the first blockchain comprising existing carbon credit information;

retrieving the carbon credit information;

determining and assigning values to a plurality of attributes of the carbon credit certificate based on an analysis of the carbon credit information, wherein each carbon credit attribute is given a weighting relative to other attributes of the plurality of attributes;

determining, by a scoring algorithm using a neural network, a score for the carbon credit certificate, based on each carbon credit weighted attribute value, wherein the neural network is configured to adjust at least one weighted attribute value based on an ESG compliance regulation; and determining a carbon credit rating based on the score and a mapping of score ranges to carbon credit ratings; and transmitting an update instruction to the first blockchain node computing device, the update instruction causing the first blockchain node computing device to generate and store a new block comprising an encryption of the determined carbon credit rating.

9. The computer-implemented method of claim 8, wherein when the carbon credit certificate is issued by an entity, the plurality of attributes of the carbon credit certificate including carbon dioxide emission rights.

10. The computer-implemented method of claim 8, wherein when the carbon credit certificate is issued by an entity, the plurality of attributes of the carbon credit certificate include at least one category selected from the following:

nature loss;

nature-based sequestration;

emission-reduction avoidance; and technology-based removal of carbon dioxide.

11. The computer-implemented method of claim 8, further comprising:

receiving a weighting scheme as input for the plurality of attributes of the carbon credit certificate.

12. The computer-implemented method of claim 8, further comprising:

receiving the plurality of attributes of the carbon credit certificate as input.

13. The computer-implemented method of claim 8, wherein the scoring algorithm is configured to set a desired level of granularity.

14. The computer-implemented method of claim 8, wherein the mapping of score ranges to carbon credit ratings is configurable.

15. At least one non-transitory computer-readable media having computer-executable instructions embodied thereon, wherein when executed by a carbon credit marketplace (CCM) computing device including at least one processor in communication with a memory device, the computer-executable instructions cause the at least one processor to:

receive, from the memory device, a request for carbon credit information associated with a carbon credit certificate;

perform an analysis of the carbon credit certificate as a function of the request for the carbon credit information, wherein performing the analysis of the carbon credit certificate comprises:

transmitting a query to a first blockchain node computing device of a first blockchain, wherein the query causes the first blockchain node computing device to identify a last block in the first blockchain comprising existing carbon credit information;

retrieving the carbon credit information;

determining and assigning values to a plurality of attributes of the carbon credit certificate based on an analysis of the carbon credit information, wherein each carbon credit attribute is given a weighting relative to other attributes of the plurality of attributes;

determining, by a scoring algorithm using a neural network, a score for the carbon credit certificate, based on each carbon credit weighted attribute value, wherein the neural network is configured to adjust at least one weighted attribute value based on an ESG compliance regulation; and determining a carbon credit rating based on the score and a mapping of score ranges to carbon credit ratings; and transmit an update instruction to the first blockchain node computing device, the update instruction causing the first blockchain node computing device to generate and store a new block comprising an encryption of the determined carbon credit rating.

16. The at least one non-transitory computer-readable media of claim 15, wherein when the carbon credit certificate is issued by an entity, the plurality of attributes of the carbon credit certificate comprise carbon dioxide emission rights.

17. The at least one non-transitory computer-readable media of claim 15, wherein when the carbon credit certificate is issued by an entity, the plurality of attributes of the carbon credit certificate include at least one category selected from the following:

nature loss;

nature-based sequestration;

emission-reduction avoidance; and technology-based removal of carbon dioxide.

18. The at least one non-transitory computer-readable media of claim 15, wherein the at least one processor is further caused to:

receive a weighting scheme as input for the plurality of attributes of the carbon credit certificate.

19. The at least one non-transitory computer-readable media of claim 15, wherein the at least one processor is further caused to:

receive the plurality of attributes of the carbon credit certificate as input.

20. The at least one non-transitory computer-readable media of claim 15, wherein the scoring algorithm is configured to set a desired level of granularity.

* * * * *